United States Patent
Walkingshaw et al.

(10) Patent No.: US 10,883,416 B2
(45) Date of Patent: Jan. 5, 2021

(54) VALVE ASSEMBLY FOR MULTI-CHANNEL TURBINE

(71) Applicant: BorgWarner Inc., Auburn Hills, MI (US)

(72) Inventors: Jason Robert Walkingshaw, Heidelberg (DE); Ondrej Cempirek, Kirchheimbolanden (DE); Ivan Injac, Kirchheimbolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/361,877

(22) Filed: Mar. 22, 2019

(65) Prior Publication Data

US 2019/0301355 A1 Oct. 3, 2019

(30) Foreign Application Priority Data

Mar. 27, 2018 (DE) .................... 20 2018 101 705 U
Feb. 22, 2019 (EP) ..................................... 19158717

(51) Int. Cl.
*F02B 37/18* (2006.01)
*F01D 17/14* (2006.01)
(Continued)

(52) U.S. Cl.
CPC .......... *F02B 37/186* (2013.01); *F01D 17/146* (2013.01); *F02B 37/025* (2013.01);
(Continued)

(58) Field of Classification Search
CPC ...... F02B 37/18; F02B 37/183; F02B 37/186; F02B 37/22; F02B 37/025; F01D 17/105;
(Continued)

(56) References Cited

U.S. PATENT DOCUMENTS

| 2010/0059026 A1* | 3/2010 | Schmalzl | F02B 37/025 |
| | | | 123/559.1 |
| 2014/0072412 A1* | 3/2014 | Marques | F01D 17/105 |
| | | | 415/144 |
| 2016/0169090 A1* | 6/2016 | Murphy | F02B 37/183 |
| | | | 415/144 |

FOREIGN PATENT DOCUMENTS

DE   102015105218 A1   10/2016
DE   102016006719 A1   2/2017
(Continued)

OTHER PUBLICATIONS

Machine-assisted English language abstract and Machine-assisted English language translation for DE 10 2015 105 218 extracted from espacenet.com database on Sep. 4, 2019, 13 pages.
(Continued)

*Primary Examiner* — Jesse S Bogue
*Assistant Examiner* — Loren C Edwards
(74) *Attorney, Agent, or Firm* — Howard & Howard Attorneys PLLC

(57) ABSTRACT

The disclosure relates to a valve assembly 10 for controlling a volute connecting opening 324 of a multi-channel turbine 500. The valve assembly 10 comprises a housing portion 300, a valve body 100 and an internal lever 200. The housing portion 300 defines a first volute channel 312, a second volute channel 314 and a volute connecting region 320. The housing portion 300 further comprises a cavity 340. The cavity 340 is separated from the volutes 312, 314 and can be accessed from outside the housing portion 300 via a housing opening 342 which extends from outside the housing portion 300 into the cavity 340. The volute connection region 320 is located between the first volute channel 312 and the second volute channel 314 and defines a volute connecting opening 324. The valve body 100 is inserted in the cavity 340 of the housing portion 300 and comprises at least one fin 120. The
(Continued)

internal lever 200 is coupled with the valve body 100 and configured to pivotably move the valve body 100 between a first position and a second position. In the first position of the valve body 100, the fin 120 blocks the volute connecting opening 324.

20 Claims, 13 Drawing Sheets

(51) Int. Cl.
*F02B 37/22* (2006.01)
*F02B 37/02* (2006.01)
*F02C 9/18* (2006.01)

(52) U.S. Cl.
CPC ............ *F02B 37/18* (2013.01); *F02B 37/183* (2013.01); *F02B 37/22* (2013.01); *F02C 9/18* (2013.01); *F05D 2220/40* (2013.01); *Y02T 10/12* (2013.01)

(58) Field of Classification Search
CPC ...... F01D 17/146; F02C 9/18; F05D 2220/40; Y02T 10/144
See application file for complete search history.

(56) References Cited

FOREIGN PATENT DOCUMENTS

| DE | 102016112523 A1 | 1/2018 |
| JP | S6133923 U | 3/1986 |
| WO | 2017102041 A1 | 6/2017 |
| WO | 2017207081 A1 | 12/2017 |

OTHER PUBLICATIONS

Machine-assisted English language abstract and Machine-assisted English language translation for DE 10 2016 006 719 extracted from espacenet.com database on Sep. 4, 2019, 10 pages.

Machine-assisted English language abstract and Machine-assisted English language translation for DE 10 2016 112 523 extracted from espacenet.com database on Sep. 4, 2019, 15 pages.

Machine-assisted English language translation for JPS 61-33923 extracted from espacenet.com database on Sep. 4, 2019, 2 pages.

English language abstract and machine-assisted English translation for WO 2017/102041 extracted from espacenet.com database on Sep. 4, 2019, 6 pages.

English language abstract and machine-assisted English translation for WO 2017/207081 extracted from espacenet.com database on Sep. 4, 2019, 8 pages.

\* cited by examiner (A - A)

# VALVE ASSEMBLY FOR MULTI-CHANNEL TURBINE

CROSS-REFERENCE TO RELATED APPLICATIONS

The present application claims priority to and all the benefits of European Patent Application No. 19158717.9 filed Feb. 22, 2019, and German Patent Application No. 202018101705.5 filed on Mar. 27, 2018, which are hereby expressly incorporated herein by reference in their entirety.

TECHNICAL FIELD

This disclosure relates to a valve assembly for controlling a volute connecting opening of a multi-channel turbine. Furthermore, the invention relates to a multi-channel turbine and a charging apparatus having such a valve assembly. A method for mounting such a valve assembly is also provided.

BACKGROUND

The individual mobility sector is experiencing a disruptive change. Especially, the increasing number of electric vehicles entering the market and stricter emission regulations of legislators demand higher efficiencies from traditional internal combustion engine ICE vehicles. Therefore, more and more vehicles are equipped with efficiency increasing measures, such as charging apparatuses and emission reduction devices. Well known are, for instance, charging apparatuses wherein a compressor may be driven by an e-motor (e-charger) and/or an exhaust gas powered turbine (turbocharger). Generally, an exhaust gas turbocharger has a turbine with a turbine wheel, which is driven by the exhaust gas flow of the combustion engine. A compressor with a compressor wheel arranged on a common shaft with the turbine wheel compresses the fresh air drawn in for the engine. This increases the amount of air or oxygen available to the engine for combustion. This in turn increases the performance of the combustion engine. Furthermore, to reduce emissions, it is known to provide catalysts in the exhaust system. In these catalysts, for instance, HCs and CO are oxidized to $CO_2$ and $H_2$ and $NO_x$ is reduced to nitrogen. However, these catalysts require a certain temperature high enough to work efficiently. In vehicles with turbochargers this problem is enhanced because the turbocharger is usually arranged in the exhaust gas flow direction between the engine and the catalyst.

In the state of the art, multi-channel turbines, which are used, for example, for six-cylinder engines, are particularly well known. A disadvantage of known multi-channel turbines, such as dual-volute turbines or twin-scroll turbines, is that under certain operating conditions, for example at a certain rotation speed, the flow separation in two spirals has a negative effect on the performance of the turbocharger. In order to solve this problem, the state of the art provides overflow areas or volute connecting areas in which the exhaust gases from one spiral can overflow into the other spiral and in the opposite direction. It is also known that these overflow areas can be opened and closed variably via linear actuators with an appropriate valve arrangement. It is also known to combine these overflow ranges with a bypass opening. This makes it possible to control the bypass opening and the overflow areas with the same valve arrangement. Bypass openings are usually used for bypassing the turbine at certain operating conditions, especially at high rotation speeds, in order to prevent damage of the turbocharger. A disadvantage of known systems is an increased packaging and exhaustive assembly processes as well as necessary heating measures for providing the catalyst with exhaust gases having a sufficiently high temperature.

Accordingly, the objective of the present invention is to increase the efficiency of a turbine.

SUMMARY

This present invention relates to a valve assembly for controlling a volute connecting opening of a multi-channel turbine as set out in claim 1. Furthermore, the invention relates to a corresponding multi-channel turbine and a corresponding charging apparatus having such a valve assembly as set out in claims 12 and 14, respectively. A method for mounting such a valve assembly is described in claim 15. Other aspects of the embodiments are described in the dependent claims.

The valve assembly for controlling a volute connecting opening of a multi-channel turbine comprises a housing portion with a first volute channel, a second volute channel and a volute connecting region. The volute connection region is located between the first volute channel and the second volute channel and defines a volute connecting opening. The valve assembly further comprises a valve body and an internal lever. The valve body is inserted in a cavity of the housing portion and comprises at least one fin. The internal lever is coupled with the valve body and configured to pivotably move the valve body between a first position and a second position. In the first position of the valve body the fin blocks the volute connecting opening. In the second position of the valve body the fin clears the volute connecting opening. By providing a valve which is pivotably moveable, instability problems often occurring with linear moving valves can be overcome. Configuring the main element which is responsible for opening and closing the volute connecting opening in a fin design leads advantageously to less material and less weight of the valve assembly. Thereby, less actuation energy is required, actuation response time can be accelerated, and wear may be reduced due to smaller moved masses (interacting with respective valve seats). Consequently, this leads to an increased overall efficiency of the valve assembly and the turbine. Additionally, cost can be reduced due to less required material.

In another aspect, the valve body may further comprise a plate. The fin may protrude from the plate in a first direction.

In another aspect, which is combinable with the previous aspect, the housing portion may comprise a divider wall. The divider wall may separate the first volute channel and the second volute channel. The volute connecting opening may be arranged in the divider wall and may define a fin seat. The fin may interact with the fin seat to block the volute connecting opening in the first position of the valve body.

In another aspect, which is combinable with any one of the previous aspects, the internal lever may comprise a valve portion and a spindle portion. Additionally, the internal lever may be coupled with the valve body via the valve portion. Additionally, the valve body may further comprise a connecting portion. The connecting portion may protrude from the plate in a second direction opposite to the fin. That means the connecting portion may protrude from the plate in a second direction opposite to the first direction. The valve portion may be coupled to the connecting portion. Additionally, the valve portion may further comprise a connecting hole. The connecting portion may be arranged at least partly inside the connecting hole. Additionally or alternatively, the valve portion may be secured to the connecting portion via a washer. The washer may be welded to the valve body, in particular to the connecting portion and/or to the internal lever, in particular to the valve portion. Alternatively, the internal lever and the valve body may be integrally formed.

In another aspect, which is combinable with the previous aspect, the valve body may comprise a stop. The valve portion may comprise an orientation recess which is engaged with the stop to rotationally secure the internal lever with respect to the valve body.

In another aspect, which is combinable with the previous two aspects, the valve assembly may further comprise a lever assembly with a spindle. The internal lever may be coupled with the spindle in the cavity via the spindle portion. In other words, the internal lever may be coupled with the spindle inside the housing portion, in particular within the cavity. Additionally, the spindle portion may comprise a spindle hole into which the spindle is inserted to be coupled with the internal lever. The spindle portion may optionally comprise an opening extending into the spindle hole. This provides the possibility for weldingly coupling the spindle to the internal lever via the opening. Additionally or alternatively, the spindle may be coupled to the internal lever, for instance by press-fitting the spindle into the spindle hole and/or by using force fitting means or weldingly coupling the spindle to the internal lever directly via the spindle hole.

In another aspect, which is combinable with the previous aspect, the spindle may be rotatably supported in the housing portion to pivot the internal lever thereby defining a pivot axis. Additionally, the valve assembly may further comprise a bushing. The bushing may be arranged in the housing portion. The bushing may rotatably support the spindle.

In another aspect, which is combinable with the previous two aspects, the lever assembly may further comprise an actuating lever. The actuation lever may be coupled to the spindle outside the housing portion. Additionally, the lever assembly may further comprise an actuating pin coupled to the actuating lever.

In another aspect, which is combinable with any one of the previous aspects, the housing portion may comprise a volute opening region with a valve opening. The valve opening may fluidically couple the cavity and the volute connecting region. The valve opening may further enable movement of the valve body between the first position and the second position. Additionally, the housing portion may define a plate seat in the volute opening region. The plate seat may surround the valve opening. The plate may interact with the plate seat at least in the first position of the valve body.

In another aspect, which is combinable with any one of the previous aspects, the valve assembly may further comprise a cover. The cover may close off a housing opening which extends from outside the housing portion into the cavity. Additionally, the cover may be arranged on a flange portion of the housing portion surrounding the housing opening. Additionally or alternatively, the valve assembly may comprise a gasket. The gasket may seal the housing opening between the housing portion and the cover. Optionally, the gasket may be arranged in a sealing recess of the housing portion.

In another aspect, which is combinable with any one of the previous aspects, the housing portion may further comprise a bypass opening which is arranged in the cavity. The bypass opening may be fluidically coupled with a bypass channel. By providing a bypass opening in the cavity, exhaust gas from the volute channels may flow through the cavity and the bypass opening into the bypass channel Thereby exhaust gases can be diverted before reaching the turbine. This advantageously leads to two effects: First, at high speed operation conditions, a further acceleration of the turbine by the exhaust gases can be prevented or at least reduced which prevents the turbocharger from being damaged. Second, if the bypass channel is coupled with a catalyst, the catalyst can be supplied with hot exhaust gases before they run through the turbine and the connected pipe system during which the exhaust gases usually cool down. Thereby, catalyst heating, i.e. the efficiency of the catalyst, and thereby the efficiency of the whole device can be improved. Also, emissions can be reduced in that way. By providing the bypass opening in the cavity, the bypass channel (and the opening itself) can be arranged/oriented generally anywhere in the cavity. Thus, the design freedom regarding the arrangement, shape and/or dimensional orientation of the bypass (i.e., bypass opening and/or bypass channel) can be improved. Thereby, the arrangement of the bypass can be adapted to optimally supply a catalyst with exhaust gases, for instance by reducing the flow length of the exhaust gases to the catalyst and/or by diverting generally hotter exhaust gases to the catalyst. On the other hand, the arrangement of the catalyst can be chosen more freely.

In another aspect, which is combinable with any one of the previous aspects which comprise a fin seat, the fin may have a generally wall-like shape with a thickness, a height and a length. A contour of the fin may be defined by at least a first radius and a second radius. The first and the second radii may lie in a plane which is spanned by the height and the length. The contour of the fin seat is defined by at least a first radius and a second radius. the respective contour of the fin and/or the fin seat may additionally comprise a third respective radius. The third radius may be arranged between the respective first and the respective second radius. Additionally, the first radii may define respective portions of the contours opposite of the pivot point of the internal lever with respect to the volute connecting opening. The centers of the first radii may coincide with the pivot axis.

In another aspect, which is combinable with any one of the previous aspects which comprise a fin seat, the valve assembly may further comprise a sealing. The sealing may be formed between the fin and the fin seat. By providing a sealing between the fin and the fin seat, inner leakage between the first volute channel and the second volute channel in the volute connecting region can be reduced, at least in the first position of the valve body. Thus, inner leakage between the admitting and the non-admitting volute channel can be reduced which helps to maintain pulse separation of the respective channels and thereby avoids engine transient performance, i.e. reduces time to torque. Thereby the overall efficiency of the device can be increased. Additionally, the sealing may comprise a sealing element. The sealing element may be attached to the fin or to the fin seat. The sealing element may comprise different materials and/or structures. To only name a few, the sealing element may comprise a metal mesh, a wire mesh, a sheet metal or any other suitable material. The sealing element may be attached to the fin or to the fin seat by welding, pressing, riveting, gluing or may be formed together with the respective element (fin or to the fin seat) in an integrated casting process. Furthermore, other suitable attaching processes known to the skilled person may also be used. The sealing element may be configured in one of various different shapes. In particular a cross-section of the sealing element may comprise a c-shape, a v-shape, a diamond shape, a hash shape or any other suitable shape. The sealing element may comprise at least one opening in the shape of the cross-section. Alternatively or additionally to the sealing element, the sealing may comprise a labyrinth-style sealing portion. By means of the labyrinth-style sealing portion the fin and the fin seat may engagingly interact such that, at least in the first position of the valve body, the fin and the fin seat at least partly overlap in a direction from the first volute channel towards the second volute channel. In other words, at least in the first position of the valve body, the fin and the fin seat at least partly overlap in a direction of the thickness of the fin. Additionally, the labyrinth-style sealing portion may comprise a protrusion and a recess. At least in the first position of the valve body, the protrusion and the recess may engagingly couple with each other. The protrusion may be formed at one of the fin or the fin seat and follows, i.e. extends along, the respective one contour. The recess may be formed at the other of the fin and the fin seat and follows, i.e. extends along, the respective other contour.

In another aspect, which is combinable with any one of the previous aspects which comprise a wall-shaped fin, the valve assembly may comprise a first fin and a second fin. The first fin and the second fin may be arranged spaced apart by at least a thickness of the divider wall on the plate, such that at least in the first position of the valve body the fins are arranged on a respective flank side of the divider wall adjacent to the fin seat. As the valve assembly according to this aspect comprises two fins which can slide to the respective sides, i.e. flank sides, of the divider wall, the contours of the fins and the contour of fin seat need not conform to each other. This is possible because the sealing between the two volute channels is mainly accomplished by an overlap of the fins and the fin seat, i.e. the divider wall in a direction of the divider wall thickness. Furthermore, the fin geometry is independent of pivot point of the valve body. That means on the other hand that the pivot point can be placed further away from the housing portion, or generally more independently from the shape of the fin and/or fin seat at a desired position. Thus, packaging can be improved and a larger volute connecting area, i.e. a larger opening area (e.g. rectangular instead of rounded) can be implemented. Additionally, if the housing portion comprises a volute opening region, the valve opening may have a H-shape with a first land and a second land. The first land may be longer than the second land. The lands may coincide with the divider wall. The first land may be arranged opposite the pivot axis with respect to the valve opening. The second land may be arranged on the same side of the pivot axis with respect to the valve opening. Additionally, the plate may have a lengthier segment extending beyond the fins in a direction, i.e. a side, of the first land. Furthermore, the plate may have a shorter segment extending beyond the fins in a direction of the second land. Thereby, the lengthier segment may be longer than the shorter segment.

In another aspect, which is combinable with the previous aspect, the first fin and the second fin may be shaped identically. The first radii of the fins may be larger than the second radii of the fins, respectively. Thereby, depending on the size and shape of the valve opening a collision of the fins with the housing portion in the area of the volute opening region can be prevented.

The present invention further relates to a multi-channel turbine for a charging apparatus. The multi-channel turbine comprises a turbine housing defining a first volute and a second volute. The first volute and the second volute are connected to an exhaust manifold of an engine. The multi-channel turbine further comprises a turbine wheel and a valve assembly of any one of the previous aspects. Additionally, the valve assembly may be arranged in the exhaust manifold or in the turbine housing. Additionally or alternatively, the valve assembly may be a modular part or may be integrally formed with the exhaust manifold or the turbine housing. More specifically, the latter means that the housing portion of the valve assembly may be integrally formed with the exhaust manifold or the turbine housing. Additionally or alternatively, the first and the second volute may be separated from each other by a first housing tongue and a second housing tongue of the turbine housing in an inlet region onto the turbine wheel. Additionally, a first radial gap may be provided between the turbine wheel and the first housing tongue. A second radial gap may be provided between the turbine wheel and the second housing tongue. Additionally, the first radial gap and/or the second radial gap may have a width of 0.5 mm to 5 mm, preferably a width between 0.75 mm and 1.5 mm and in particular, a width of 1 mm.

The present invention further relates to a charging apparatus. The charging apparatus comprises a compressor and a turbine of any one of the previous aspects which is rotationally coupled to the compressor.

In another aspect of the charging apparatus, which is combinable with the previous aspect in which the housing portion comprises a bypass opening, the charging apparatus may further comprise a catalyst. The catalyst may be arranged downstream of the turbine and may be fluidically coupled with the bypass channel.

The present invention further relates to a method for mounting a valve assembly for controlling a volute connecting opening of a multi-channel turbine. The method comprises:

providing a housing portion with a cavity, a first volute channel and a second volute channel, attaching an internal lever to a valve body, inserting the internal lever and the valve body into the cavity through a housing opening, inserting a spindle into a drill, in particular a drill of the housing portion such that it extends into a spindle hole of the internal lever inside the cavity, and welding inside the cavity the spindle to the internal lever through an opening of the internal lever which extends into the spindle hole.

In another aspect of the method, the internal lever and the valve body may be integrally formed with each other. Alternatively, a connecting portion of the valve body may be inserted into a connecting hole of the internal lever, i.e. of a valve portion of the internal lever, and secured via a washer. The washer may be welded to the valve body, in particular to the connecting portion and/or to the internal lever, in particular to the valve portion.

In another aspect of the method, which is combinable with the previous aspect, inserting the internal lever and the valve body into the cavity may comprise bringing into contact a valve plate of the valve body with a plate seat surrounding a valve opening which fluidically couples the cavity and a volute connecting region between the first volute channel and the second volute channel. Additionally, the valve plate may maintain in contact with the plate seat during welding.

Alternatively to the previous aspect, wherein inserting the internal lever and the valve body into the cavity may comprise inserting a fin connected to a valve plate of the valve body through a valve opening from the cavity into a volute connecting region to interact with a fin seat and bringing into contact the valve plate with a plate seat surrounding the valve opening.

In another aspect of the method, which is combinable with any one of the previous aspects, after welding, the housing opening may be closed with a cover. A gasket may be inserted between the cover and the housing portion before closing the housing opening with the cover.

In another aspect of the method, which is combinable with any one of the previous aspects, after welding, an actuating lever may be attached to the spindle outside the housing portion. Thereby, the actuation lever can be attached to the spindle in any desired orientation. That means by first welding the spindle to the internal lever in a closed position of the valve body, the actuation lever can be attached in an exact rotational orientation as required by an actuation system. Thereby, the chance of assembling errors, i.e. a wrong/not exact orientation of the actuation lever can be prevented or at least reduced.

In another aspect of the method, which is combinable with any one of the previous aspects, before inserting the spindle, a bushing may be inserted into the drill. The spindle may be subsequently inserted into the bushing.

DETAILED DESCRIPTION

Figure 1:
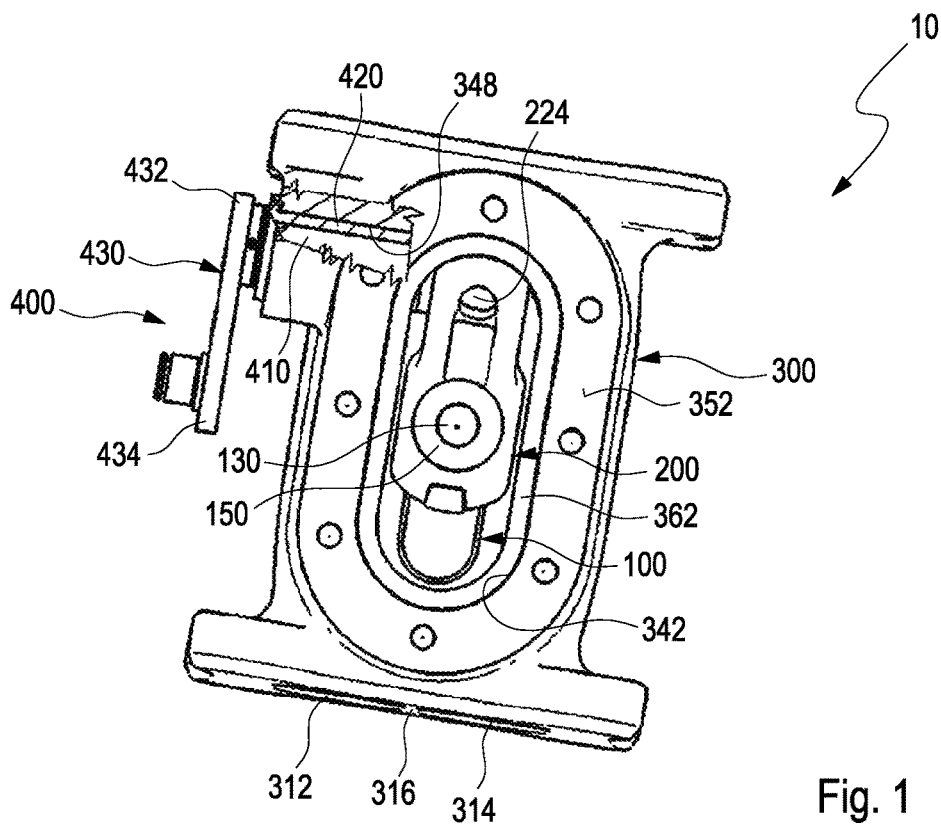
FIG. 1 shows a top view of the valve assembly with a partially sectioned housing portion.
Figure 3:
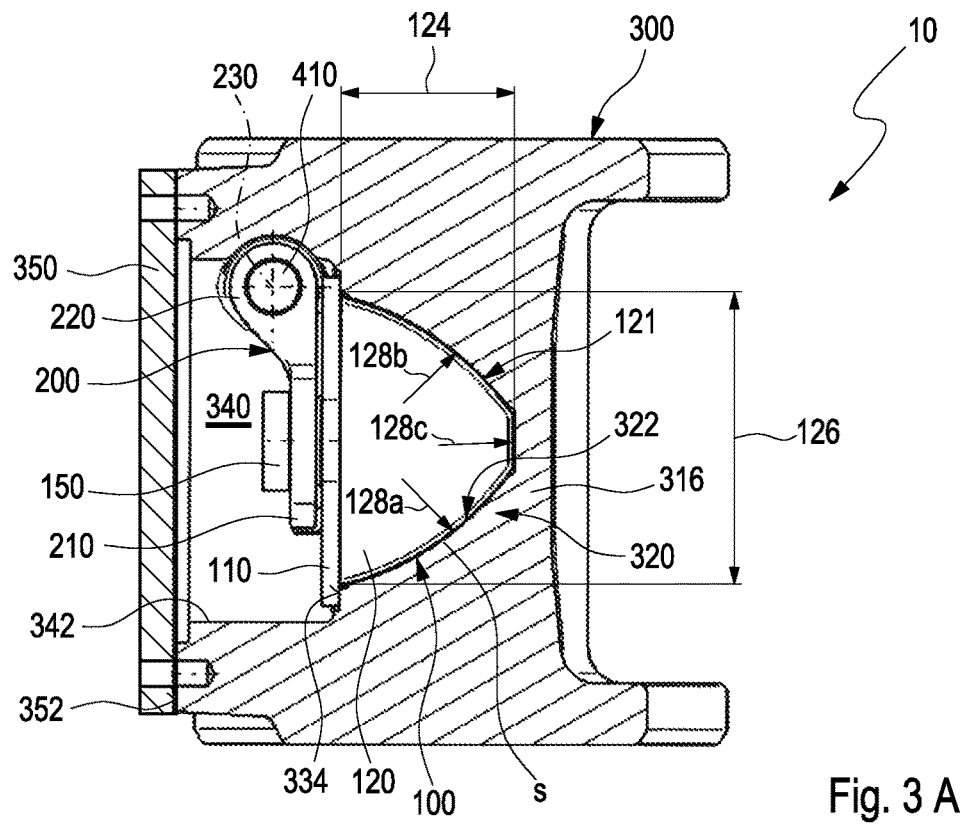
FIGS. 3A-3B show side views of the valve assembly with a sectioned housing portion and a sectioned cover, the valve body being depicted in the first position and the second position, respectively.
Figure 4:
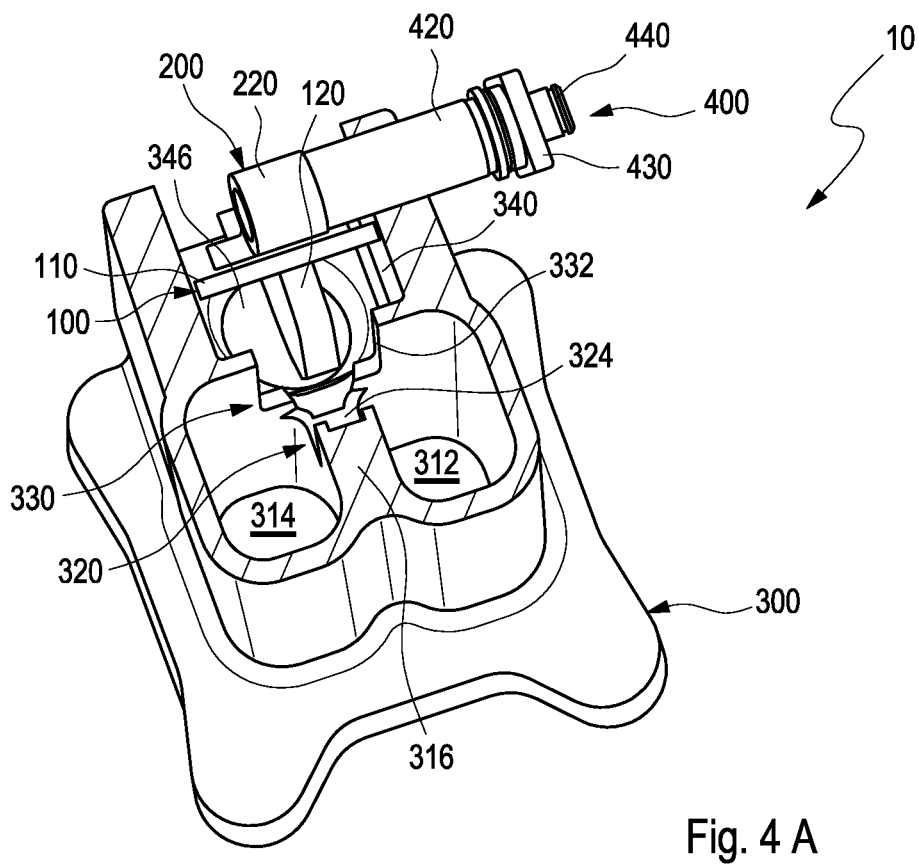
FIGS. 4A-4B show an isometric view and a side view of the valve assembly with the housing portion being sectioned along two orthogonal planes, respectively, wherein the housing portion comprises a bypass opening and a bypass channel and wherein the valve body is depicted in the second position.
Figure 4:
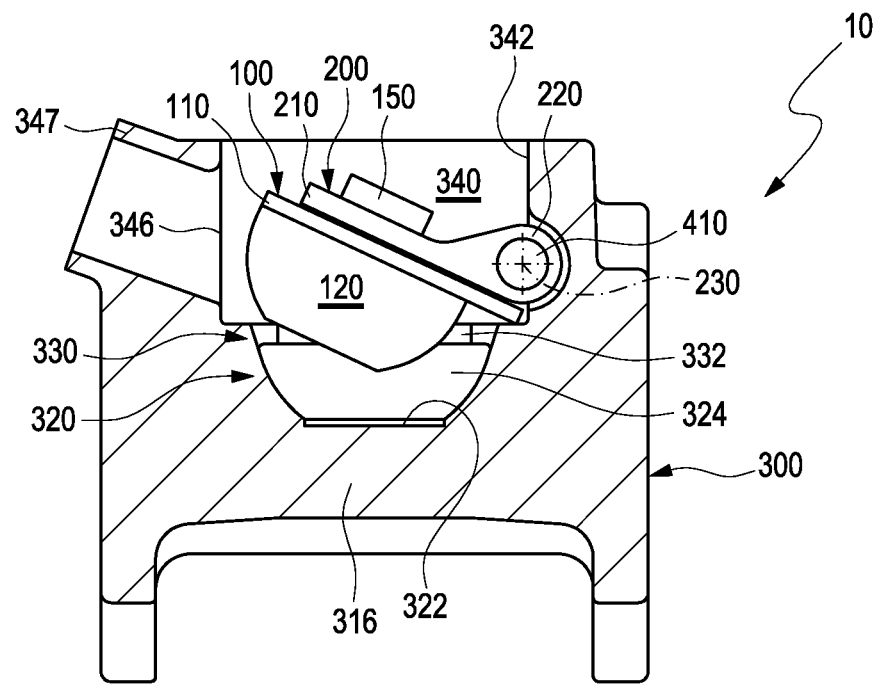
Figure 5:
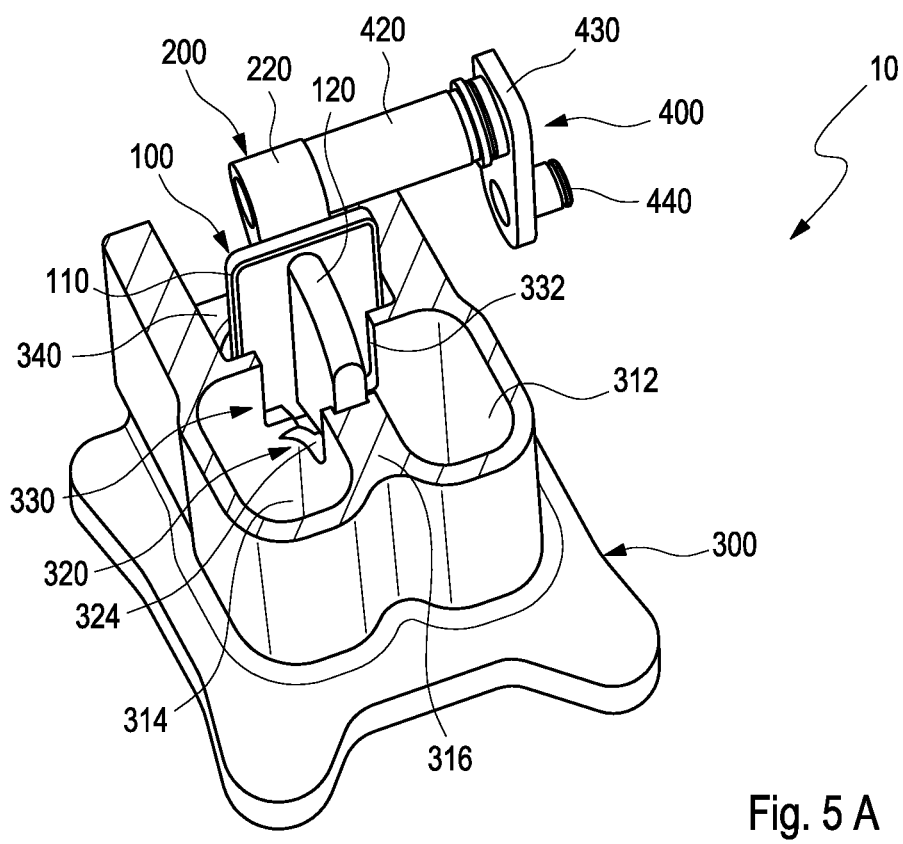
FIGS. 5A-5B show an isometric view and a side view of the valve assembly with the housing portion being sectioned along two orthogonal planes, respectively, wherein the housing portion comprises a bypass opening and a bypass channel and wherein the valve body is depicted in the first position.
Figure 5:
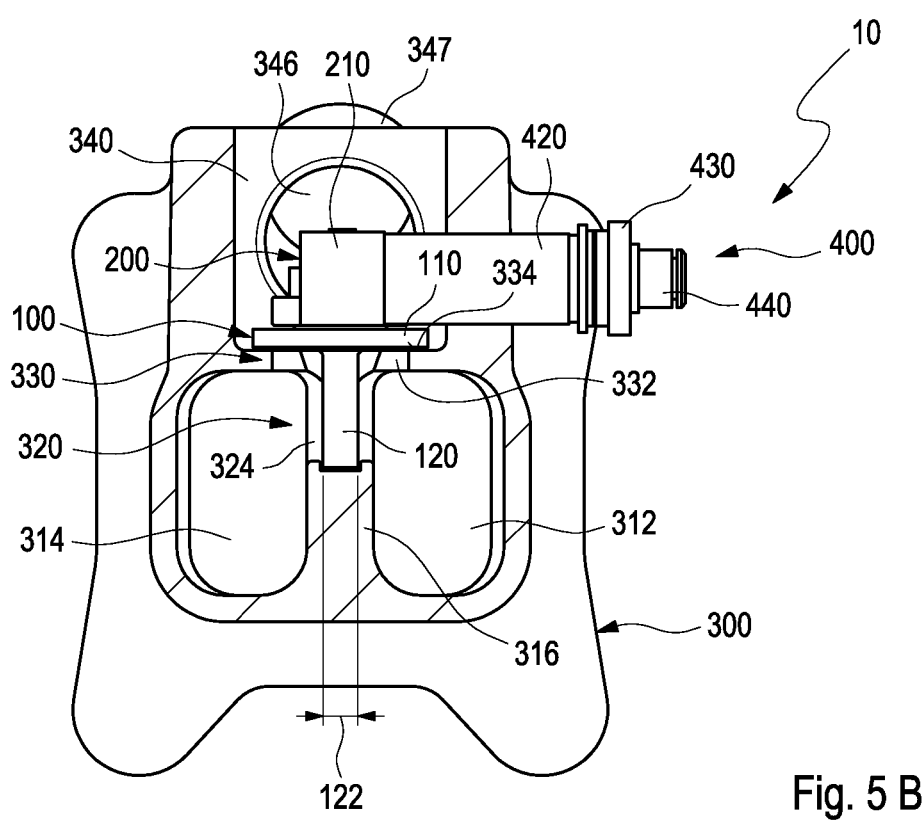

FIG. 1 shows the valve assembly 10 for controlling a volute connecting opening 324 of a multi-channel turbine 500. The valve assembly 10 comprises a housing portion 300, a valve body 100 and an internal lever 200. The housing portion 300 defines a first volute channel 312, a second volute channel 314 and a volute connecting region 320 (see also FIG. 4A). The housing portion 300 further comprises a cavity 340 (see also FIG. 3A). The cavity 340 is separated from the volutes 312, 314 and can be accessed from outside the housing portion 300 via a housing opening 342 which extends from outside the housing portion 300 into the cavity 340. The volute connection region 320 is located between the first volute channel 312 and the second volute channel 314 and defines a volute connecting opening 324. The first volute channel 312 and the second volute channel 314 can be fluidically coupled via the volute connecting opening 324. The valve body 100 is inserted in the cavity 340 of the housing portion 300 and comprises at least one fin 120. The internal lever 200 is coupled with the valve body 100 and configured to pivotably move the valve body 100 between a first position and a second position. In the first position of the valve body 100, the fin 120 blocks the volute connecting opening 324. Thus, exhaust gases are substantially prevented from overflowing from the first volute channel 312 to the second volute channel 314 and vice versa. In the second position of the valve body 100 the fin 120 clears the volute connecting opening 324. Thus, exhaust gases are enabled to overflow from the first volute channel 312 to the second volute channel 314 and vice versa. By providing a valve body 100 which is pivotably moveable, instability problems often occurring with linear moving valves can be overcome. Configuring the main element which is responsible for opening and closing the volute connecting opening 324 in a fin design leads advantageously to less material and less weight of the valve assembly 10. Thereby, less actuation energy is required, actuation response time can be accelerated, and wear may be reduced due to smaller moved masses (interacting with respective valve seats). Consequently, this leads to an increased overall efficiency of the valve assembly 10 and the turbine 500. Additionally, cost can be reduced due to less required material. The expression fin 120 is generally to be understood as a geometrical element having a substantially wall-shape or plate shape, thus having one dimension which is much smaller than the other two dimensions, which are more or less similar.

Figure 2:
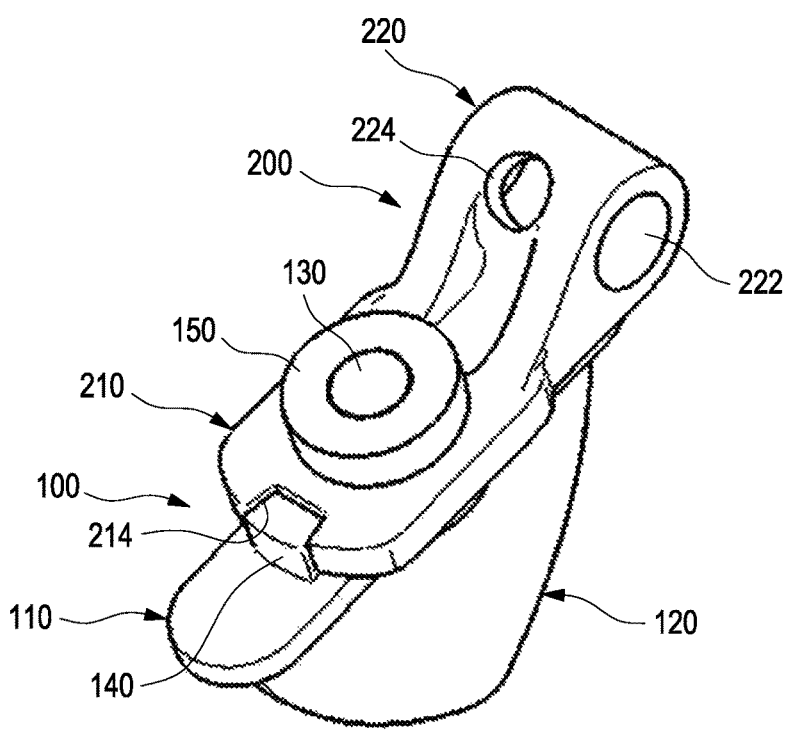
FIG. 2 shows a detailed isometric view of the valve body and the internal lever.

The fin 120 can represent the valve body 100 (not depicted). Alternatively, and as depicted in the figures, the valve body 100 may further comprise a plate 110. Therefore, see FIG. 2 which depicts the valve body 100 and the internal lever 200 in more detail. The fin 120 protrudes from the plate 110 in a first direction. As illustrated in FIGS. 3A and 3B the fin 120 extends from the plate 110 in the closing direction of the valve body 100. That means the first direction is oriented in the closing direction of the valve body 100. The fin 120 and the plate 110 are thereby arranged orthogonally to each other. With further reference to FIG. 2 the internal lever 200 comprises a valve portion 210 and a spindle portion 220. The internal lever 200 is coupled with the valve body 100 via the valve portion 210. More specifically, the valve body 200 comprises a connecting portion 130. The connecting portion 130 protrudes from the plate 110 in a second direction opposite to the fin 120. That means the connecting portion 130 protrudes from the plate 110 in the second direction which is opposite to the first direction. Thus, the valve portion 210 of the internal lever 200 is coupled to the connecting portion 130 of valve body 100. Therefore, the valve portion 210 comprises a connecting hole 212 (see, e.g., FIG. 7A). The connecting portion 130 is arranged at least partly inside the connecting hole 212. The valve portion 210 is secured to the connecting portion 130 via a washer 150. Therefore, the washer 150 is also arranged on the connecting portion 130. The valve portion 210 is thereby arranged between the washer 150 and the plate 110 (see, e.g., FIG. 7B). The washer 150 is welded to the valve body 100, in particular to the connecting portion 130. Additionally, the washer 150 may be welded to the internal lever 200, in particular to the valve portion 210. The valve body 100 further comprises a stop 140 which is engaged with an orientation recess of the internal lever 200, i.e. of the valve portion 210, to rotationally secure the internal lever 200 with respect to the valve body 100. In alternative embodiments, which are not shown in the figures, the internal lever 200 and the valve body 100 may be integrally formed.

Figure 7:
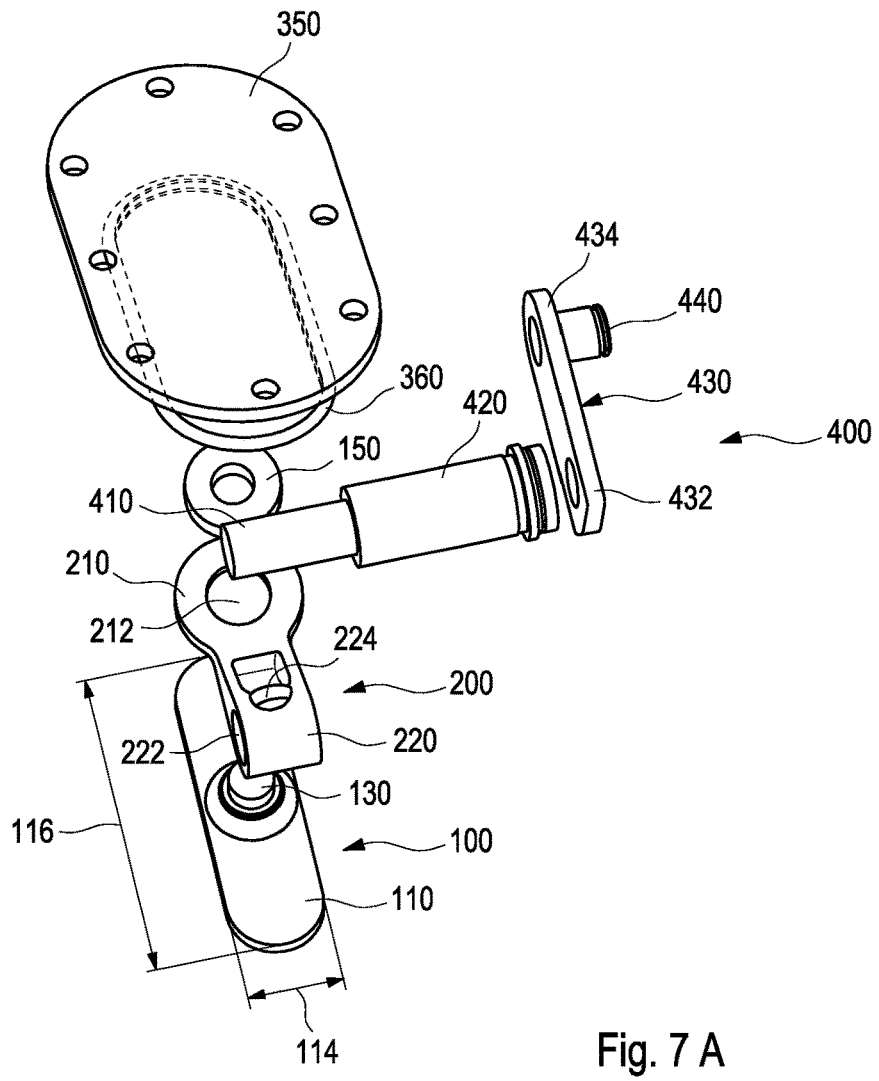
FIGS. 7A-7B show the group of valve body, internal lever and lever assembly in an exploded and an isometric view, respectively.
Figure 7:
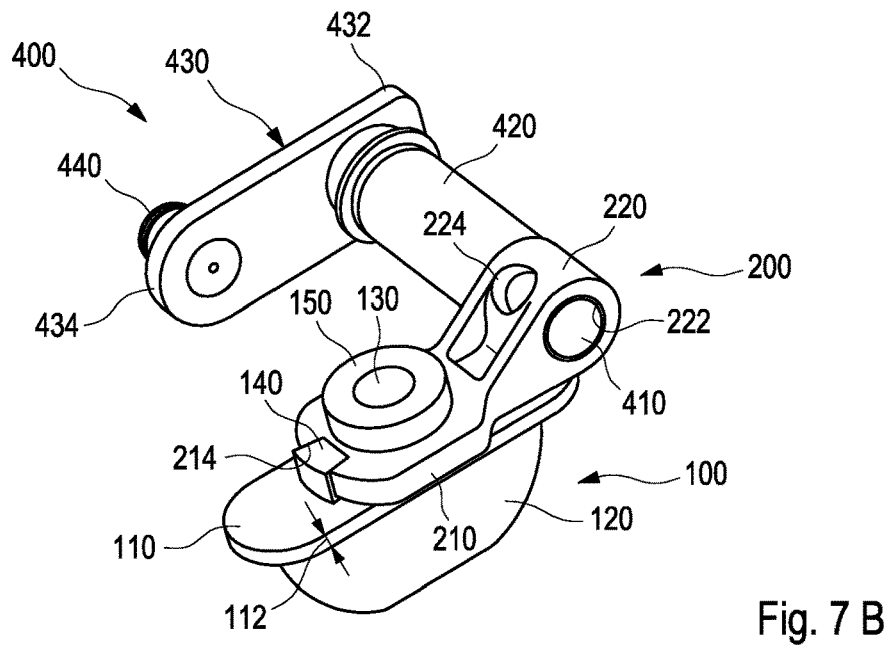
Figure 8:
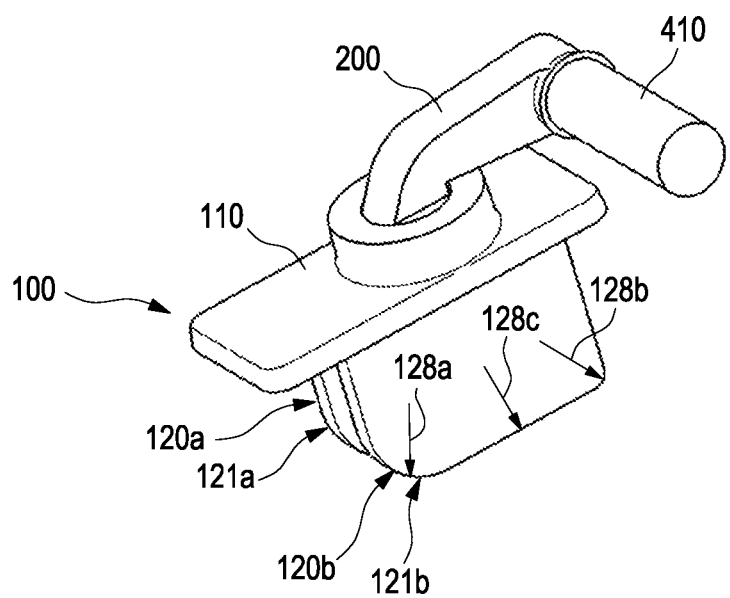
FIGS. 8A-8B show the group of valve body, internal lever and lever assembly in an isometric view alone and partly inserted into the valve opening, wherein the valve body comprises two fins.
FIG. 8C show details of the valve opening according to the embodiment of FIGS. 8A-8B.
Figure 8:
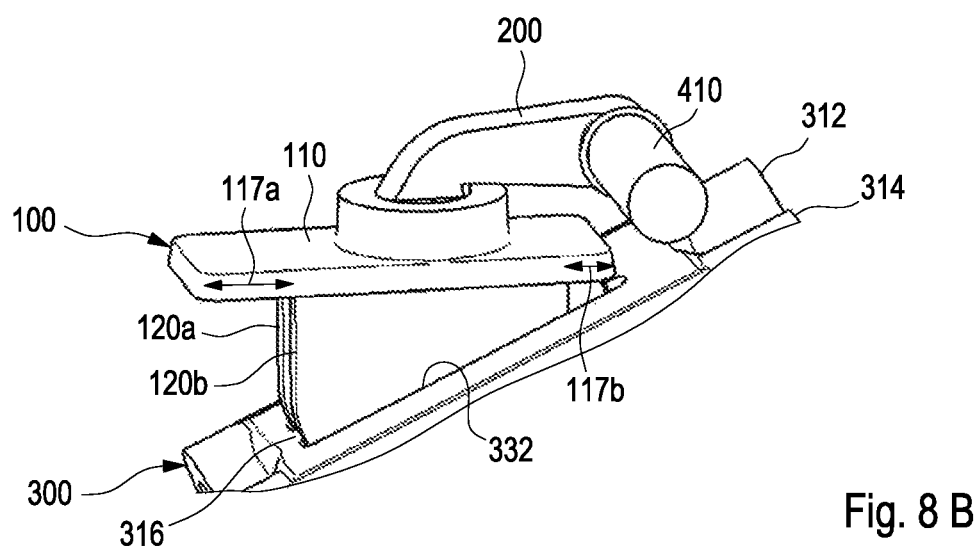
Figure 8:
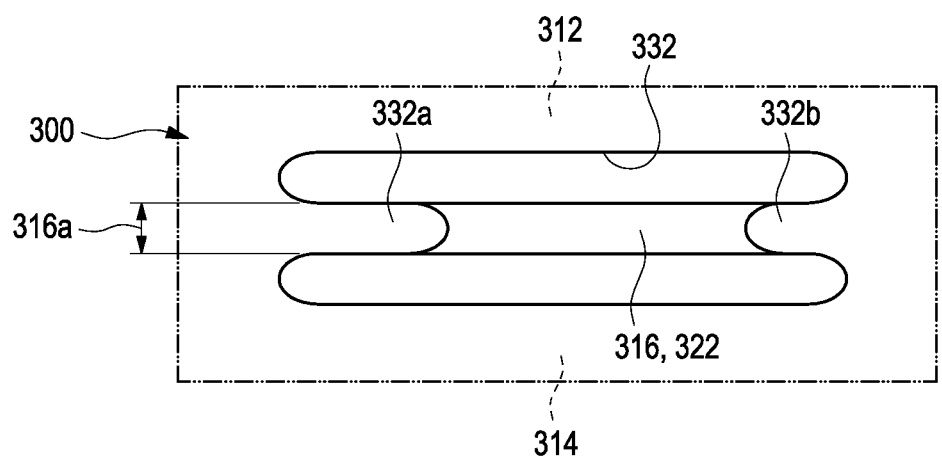
Figure 9:
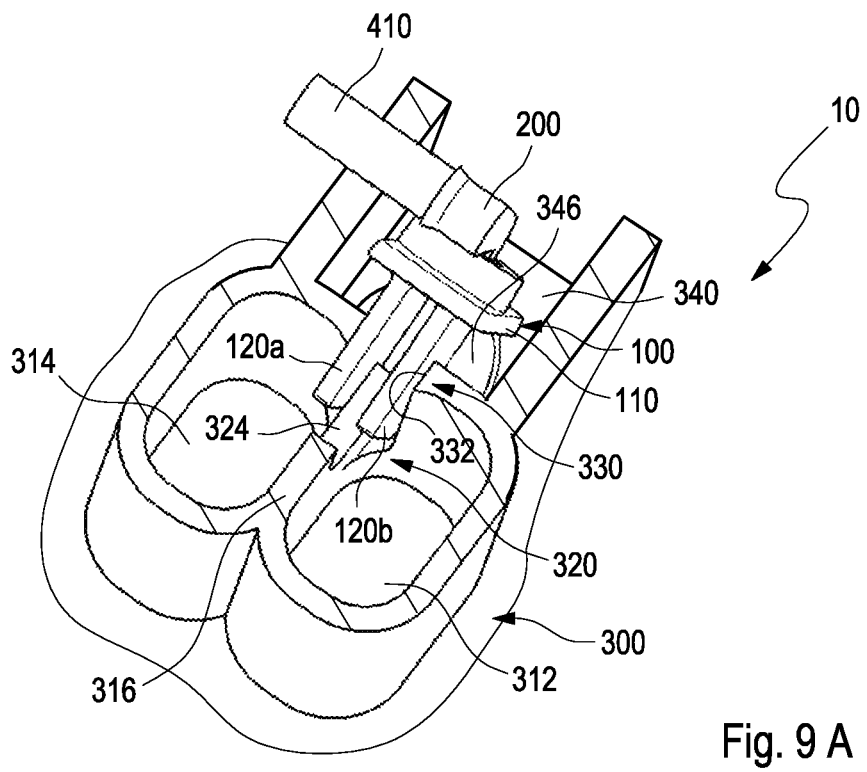
FIG. 9A shows an isometric view of the valve assembly with a sectioned housing, wherein the housing portion comprises a bypass opening and a bypass channel and wherein the valve body is depicted in the second position and having two fins.
FIG. 9B shows a side view of the valve assembly according to FIG. 9A, but the valve body being in the first position.
Figure 9:
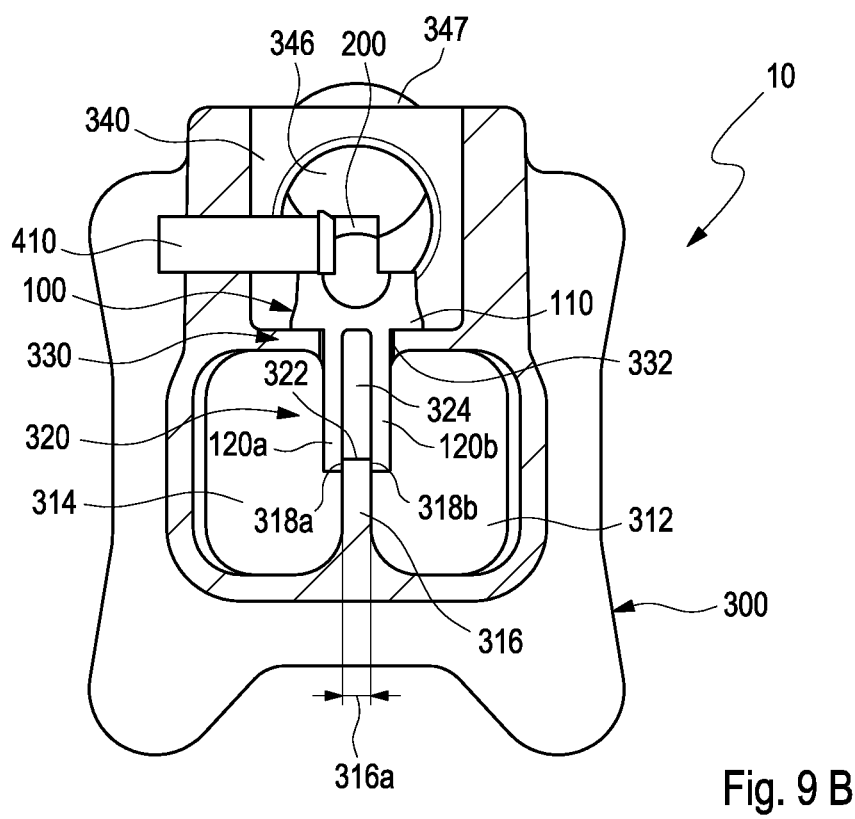

With further reference to FIGS. 7A and 7B the valve assembly 10 further comprises a lever assembly 400 with a spindle 410, a bushing 420, an actuating lever 430 and an actuating pin 440. The internal lever 200 is coupled with the spindle 410 in the cavity 340 via the spindle portion 220. In other words, the internal lever 200 is coupled with the spindle 410 inside the housing portion 300, in particular within the cavity 340. The spindle portion 220 comprises a spindle hole 222 into which the spindle 410 is inserted (to be coupled with the internal lever 200). Thereby, the spindle 410 is inserted from outside the housing portion 300 through a drill 348 into the spindle hole 222. Furthermore, the spindle portion 220 comprises an opening 224 extending into the spindle hole 222. This provides the possibility for weldingly coupling the spindle 410 to the internal lever 200 via the opening 224. As the internal lever 200 is coupled with the spindle 410 inside the cavity 340, the welding can be performed through the housing opening 342 inside the cavity 340. Additionally or alternatively, the spindle 410 can be coupled to the internal lever 200, for instance by press-fitting the spindle 410 into the spindle hole 222 and/or by using force fitting means or weldingly coupling the spindle 410 to the internal lever 200 directly via the spindle hole 222. The spindle 410 is rotatably supported in the housing portion 300 via the bushing 420. The bushing 420 is arranged in the housing portion 300, in particular in the drill 348 of the housing portion 300. Alternatively, the spindle 410 can be directly mounted in the housing portion 300, i.e. in the drill 348 of the housing portion 300. Then a bushing 420 is not necessary. By rotatably mounting the spindle 410 in the housing portion 300 the internal lever 200 can be pivoted. Thereby a pivot axis or pivot point (230), i.e. axis of the spindle 410 can be defined. The actuation lever 430 is coupled to the spindle 410 outside the housing portion 300. Therefore, the spindle 410 extends outside the housing portion 300 (cf. FIG. 4A) or the actuation lever 430 extends partly into the housing portion 300, i.e. into the drill 348 (not depicted). More specifically, the actuation lever 430 comprises a first end portion 432. The first end portion 432 is coupled to the spindle 410. Furthermore, the actuation lever 430 comprises a second end portion 434. The second end portion 434 is opposite the first end portion 432. The actuating pin 440 is coupled to the actuating lever 430. In particular, the actuating pin 440 is coupled to second end portion 434.

Figure 6:
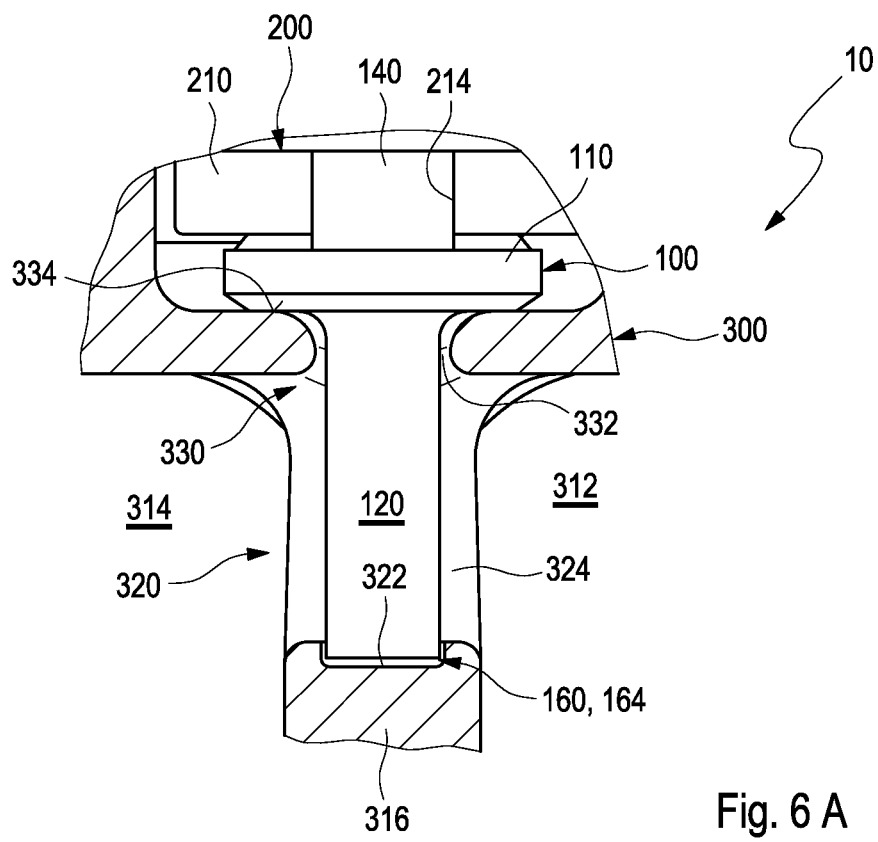
FIG. 6A shows a detailed image section of the valve assembly of FIG. 5B clarifying the relationships between the valve body and the housing portion.
FIG. 6B shows a detailed image section of the valve assembly of FIG. 3B clarifying the relationships between the cover, the gasket and the housing portion.
Figure 6:
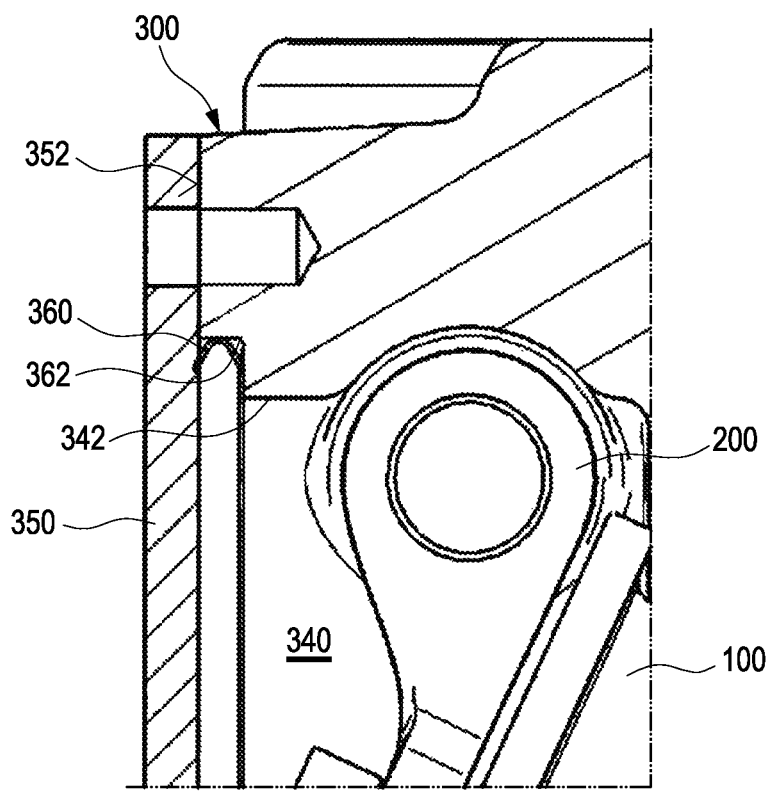

With reference to FIGS. 3A-5B further details of the housing portion 300 and the interaction with the valve body 100 will be explained. The housing portion 300 comprises a divider wall 316 which separates the first volute channel 312 and the second volute channel 314 (see, e.g., FIG. 4A). The volute connecting opening 324 is arranged in the divider wall 316 and defines a fin seat 322 (see, e.g., FIG. 4B). The housing portion 300 further comprises a volute opening region 330 with a valve opening 332. The valve opening 332 fluidically couples the cavity 340 and the volute connecting region 320. More specifically, the valve opening 332 fluidically couples the cavity 340 with the first volute channel 312 and the second volute channel 314. Thereby the valve opening 332 enables movement of the valve body 100, in particular the fin 120, between the first position and the second position, i.e. between the cavity 340 and the volute connecting opening 324. Thus, the fin 120 can move through the valve opening towards the volute connecting region 320, i.e. towards the fin seat 322. In other words, the valve body 100 can be moved from the cavity 340 into the volute connecting region 320. Thereby, the plate 110 usually always remains in the cavity 340 in any position of the valve body 100. The fin 120 however can be moved only partially out of volute connecting opening 324 in the second position of the valve body 100 (see, e.g. FIG. 3B). Alternatively, the fin 120 can be moved fully out of volute connecting opening 324 in the second position of the valve body 100 (not depicted). This mainly depends on the configuration of the cavity 340 and of the valve body 100. In the first position of the valve body 100, the fin 120 interacts with the fin seat 322 to block the volute connecting opening 324 (cf. FIGS. 4B and 5B). The housing portion 300 defines a plate seat 334 in the volute opening region 330. The plate seat 334 surrounds the valve opening 332. The plate 110 interacts with the plate seat 334 at least in the first position of the valve body 100 (see e.g. FIGS. 3A and 3B). The expression "interact" in the latter case is to be understood in the meaning of "making contact" to substantially prevent exhaust gases from entering the cavity 340. That means the plate 110 contacts the plate seat 334 and closes the valve opening 332. Similarly, the fin 120 may make contact, preferably may make almost contact with the fin seat 322. However, if the valve assembly is configured such that both, the plate 110 and the fin 120 make contact with the plate seat 334 and the fin seat 322, respectively, the size tolerances are very small, and the respective parts have to be machined precisely. Therefore, one of the plate 110 or the fin 120 preferably does not make contact with the respective seat 334, 322. Preferably the fin 120 does not make contact with the fin seat 322 and the plate 110 does make contact with the plate seat 334 (see FIG. 6A). Particularly in such a case a sealing 160 provided between the fin 120 and the fin seat 322 is advantageously as discussed further below with reference to FIGS. 10A-10F.

The valve assembly 10 further comprises a cover 350 (see FIG. 7A). The cover 350 is configured close off the housing opening 342, i.e. the cavity 340. Therefore, the cover 350 is attached to the housing portion 300 (see FIGS. 3A and 3B). The housing portion 300 comprises a flange portion 352 surrounding the housing opening 342 (see FIG. 1). The cover 350 is arranged on the flange portion 352. In other words, the cover 340 is attached to the flange portion 352 (see FIGS. 3A AND 3B). The valve assembly 10 further comprises a gasket 360 (see FIG. 7A). The gasket 360 is arranged between the housing portion 300 and the cover 350 (see FIG. 6B). Thereby, the gasket 360 seals the housing opening 342 between the housing portion 300 and the cover 350. The housing portion 300 comprises a sealing recess 362 in which the gasket 360 is arranged. In alternative embodiments, the gasket 360 can be omitted. This is the case when the cover 350 provides sufficient sealing at housing opening 342, for instance by pressing the cover 350 tightly against the flange portion 352. By providing the housing opening 342, the valve body 100 and the internal lever 200 can be inserted and the internal lever 200 and the spindle 410 can be welded conveniently during assembly. By the provision of the cover 350 (and, if applicable, the gasket 360) a tight sealing of the cavity 340 can be provided. Furthermore, the cover 350 may serve as a hard stop. Thereby the second position of the valve body 100 can be restricted (see e.g. FIG. 3B). The cover 350 may be attached by any common way known to the skilled person such as, by screwing, by bolting, by pressing or by welding. Particularly, if welding is chosen, a gasket 360 may not be necessary. Although not depicted in every single figure, it should be understood that the cover 350 can be comprised in any embodiment or configuration of the valve assembly 10.

In some embodiments, the valve assembly 10 may be combined with a bypass (see FIGS. 4A-5B and 9A-9B). Then the housing portion 300 comprises a bypass opening 346. The bypass opening 346 is arranged in the cavity 340. The bypass opening 346 is fluidically coupled with a bypass channel 347. The bypass channel 347 may partially or fully be part of the housing portion 300. Alternatively, the bypass channel 347 may be a separate part and may be attached to the housing portion 300 in the area of the bypass opening 346. By providing a bypass opening 346 in the cavity 340, exhaust gases from the volute channels 312, 314 may flow through the cavity 340 and the bypass opening 346 into the bypass channel 347. Thereby exhaust gases can be diverted before reaching the turbine 500. This advantageously leads to two effects: First, at high speed operation conditions, a further acceleration of the turbine 500 by the exhaust gases can be prevented or at least reduced which prevents the charging apparatus 20 (or turbocharger) from being damaged. Second, if the bypass channel 347 is coupled with a catalyst 800, the catalyst 800 can be supplied with hot exhaust gases before they run through the turbine 500 and the connected pipe system during which the exhaust gases usually cool down. Thereby, catalyst heating, i.e. the efficiency of the catalyst 800, and thereby the efficiency of the whole device can be improved. Also, emissions can be reduced in that way. By providing the bypass opening 346 in the cavity 340, the bypass channel 347 (and the opening itself) can be arranged/oriented generally anywhere in the cavity 340. Thus, the design freedom regarding the arrangement, shape and/or dimensional orientation of the bypass (i.e., bypass opening 346 and/or bypass channel 347) can be improved. Thereby, the arrangement of the bypass can be adapted to optimally supply a catalyst 800 with exhaust gases, for instance by reducing the flow length of the exhaust gases to the catalyst 800 and/or by diverting generally hotter exhaust gases to the catalyst 800. On the other hand, the arrangement of the catalyst 800 can be chosen more freely.

Especially, if the valve assembly comprises a bypass the plate 110 may be configured to securely close or seal the vale opening 332. This, for instance, can be accomplished by configuring the plate 110 larger than a plate 110 in a valve assembly 10 without a bypass to securely interact with the plate seat 334. Although not restricted to a specific location in the cavity 340, the bypass opening 336 can advantageously be arranged opposite to the spindle portion 220 with respect to valve body 100. If the flow direction of the exhaust gases is from right to left in FIG. 4B, i.e. from top to bottom in FIG. 4A through the first and the second volute channels 312, 314, exhaust gases can advantageously be directed into the bypass channel 337 with less flow losses in comparison to bypass opening 336 which is arranged, for instance on a wall of the housing portion 300 which lies in the plane of projection of FIG. 4B.

With reference to FIGS. 3A and 5B, the fin 120 has a generally wall-like shape with a thickness 122, a height 124 and a length 126. A contour 121 of the fin 120 is defined by at a first radius 128*a* and a second radius 128*b* and a third radius 128*c*. The third radius 128*c* defines a bottom of the fin 120, i.e. a surface in a dimension of the length 126 and the thickness 122. In other words, a portion of the contour 121 defined by the third radius 128*c* is arranged between respective portions of the contour 121 defined by the first radius 128*a* and the second radius 128*b*, respectively. Preferably, this third radius 128*c* is infinite. Thus, the bottom is straight (see, e.g., FIG. 3A). In alternative embodiments, the third radius 128*c* may be smaller than infinite and thus, the bottom may be rounded. In further alternative embodiments, there may not be a third radius 128*c* and the contour 121 of the fin 120 may only be defined by the first radius 128*a* and the second radius 128*b*. The radii 128*a*, 128*b*, 128*c* lie in a plane which is spanned by the height 124 and the length 126. A contour 321 of the fin seat 322 is also defined by respective first, second and third radii 322*a*, 322*b*, 322*c*. The explanations regarding the radii 128*a*, 128*b*, 128*c* of the fin 120 also apply to the radii 322*a*, 322*b*, 322*c* of the fin seat 322. The first radii 128*a*, 322*a* define respective portions of the contours 121, 321 opposite of the pivot point (230) of the internal lever 200 with respect to the volute connecting opening 324. The centers of the first radii 128*a*, 322*a* coincide with the pivot point (230) (see FIGS. 3A and 3B). Thereby, the portion of the contour 121 defined by the first radius 128*a* slides in close distance over the portion of the contour 321 defined by the first radius 322*a* during movement of the valve body 100. In other words, s constant gap between the portion of the contour 121 defined by the first radius 128*a* the portion of the contour 321 defined by the first radius 322*a* can be maintained at all positions of the valve body 100. Thereby, wear between the fin 120 and (the divider wall 316 of) the housing portion 300, i.e. the fin seat 322 can be prevented or at least reduced.

With reference to FIGS. 5B and 7A, analogously to the fin 120, also the plate 110 is defined by different dimensions. The plate has a generally wall-like shape with a thickness 112, a width 114 and a length 116. The plate 110 and the fin 120 are arranged orthogonally to each other. Thus, the thickness 112 has the same orientation as the height 124, the width 114 has the same orientation as the thickness 122 and the length 116 has the same orientation as the length 126. Generally, the plate 110 can have a width 114 equal to the thickness 122 of the fin 120 and/or a length 116 equal to length 126 of the fin 120. Also, the thickness 112 of plate 110 can be equal to the thickness 122 of the fin 120. However, particularly in embodiments with a bypass opening 346 and/or a bypass channel 347, the width 114 of the plate 110 is larger than the thickness 122 of the fin 120. The length 116 of the plate 110 is larger than the length 126 of the fin 120. Thereby, the plate 110 extends beyond the fin 120 to both sides in the orientation of the width 114 and/or in the orientation of the length 116 (see FIGS. 3A and 3B). In other embodiments the plate 110 may extend beyond the fin 120 only to one side in the orientation of the width 114 and/or in the orientation of the length 116.

Figure 10:
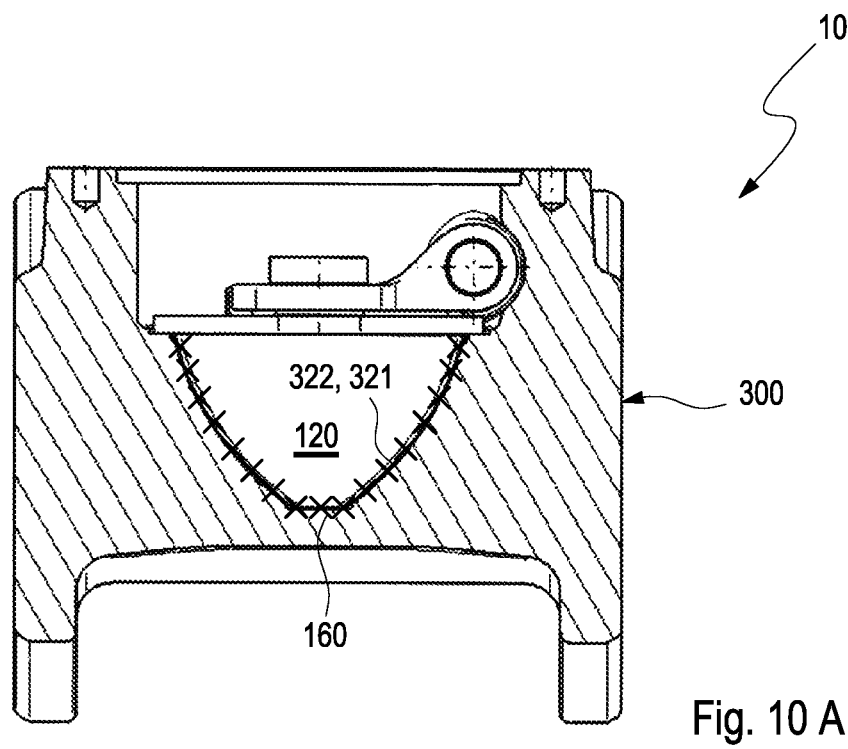
FIGS. 10A-10B show the valve assembly with a schematically depicted sealing in a side view and an isometric view.
FIGS. 10C-10E show the sealing comprising a sealing element, exemplary in three different configurations.
FIG. 10F shows the sealing comprising a labyrinth-style sealing.
Figure 10:
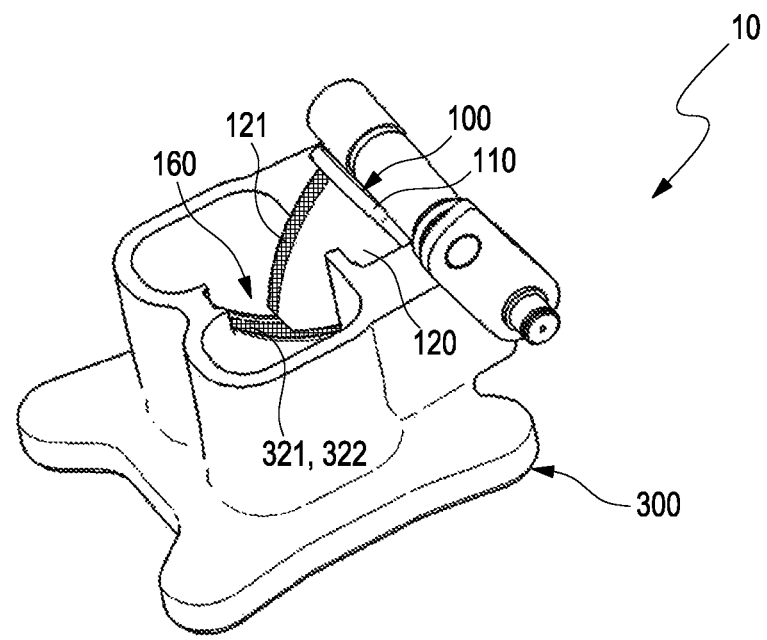
Figure 10:
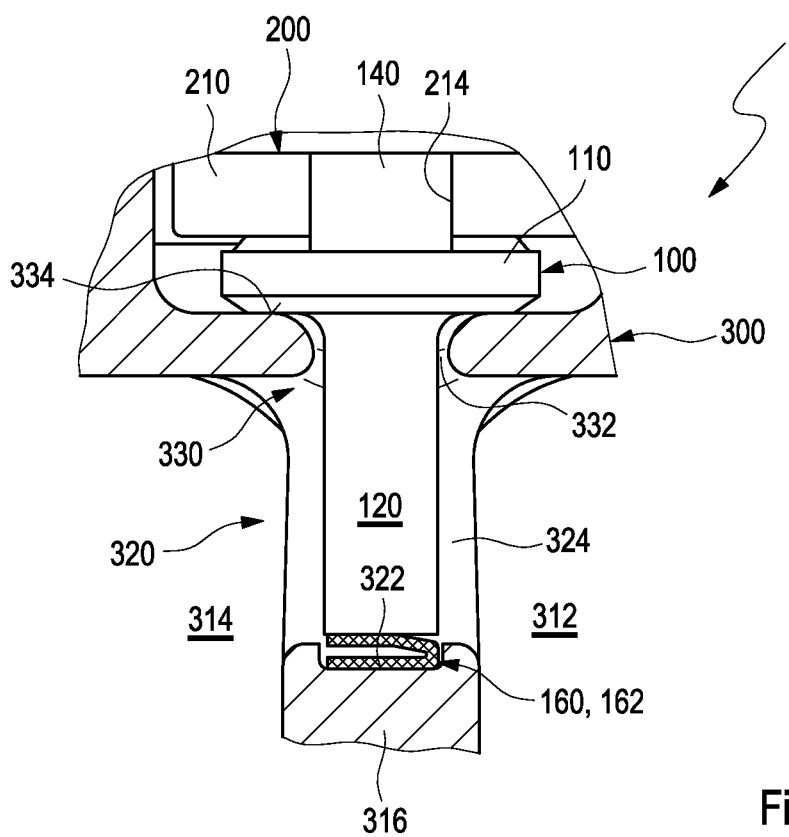
Figure 10:
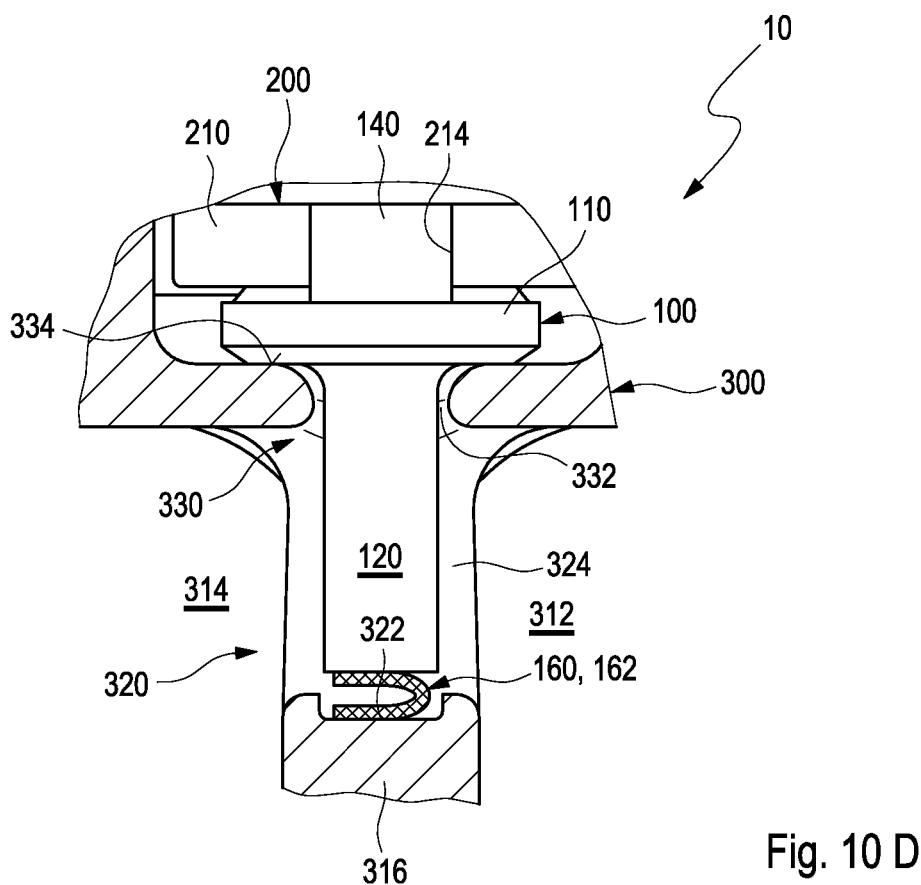
Figure 10:
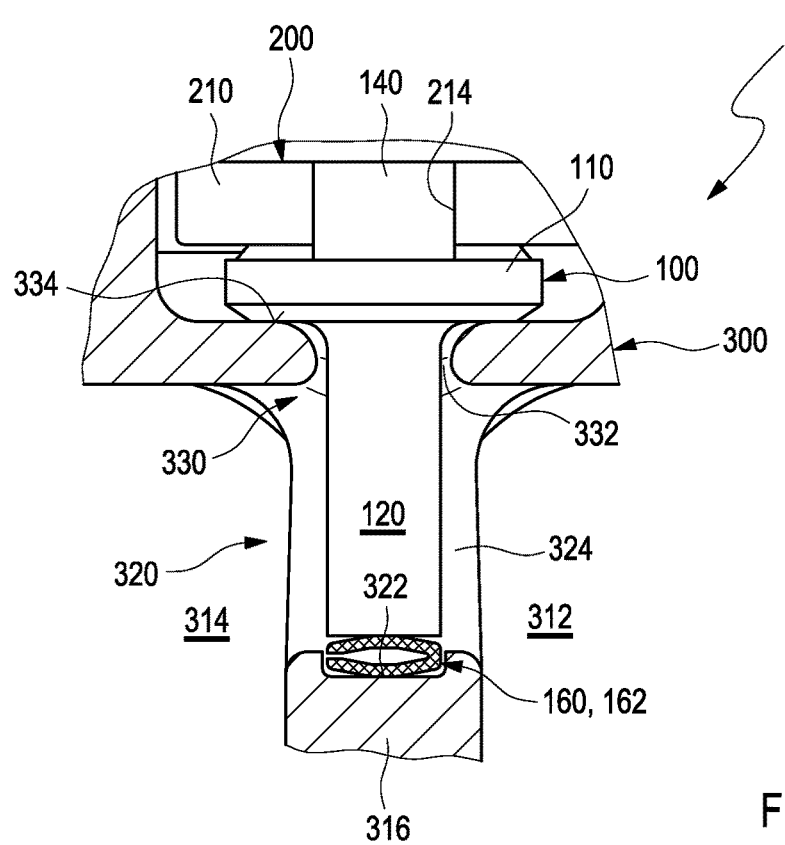
Figure 10:
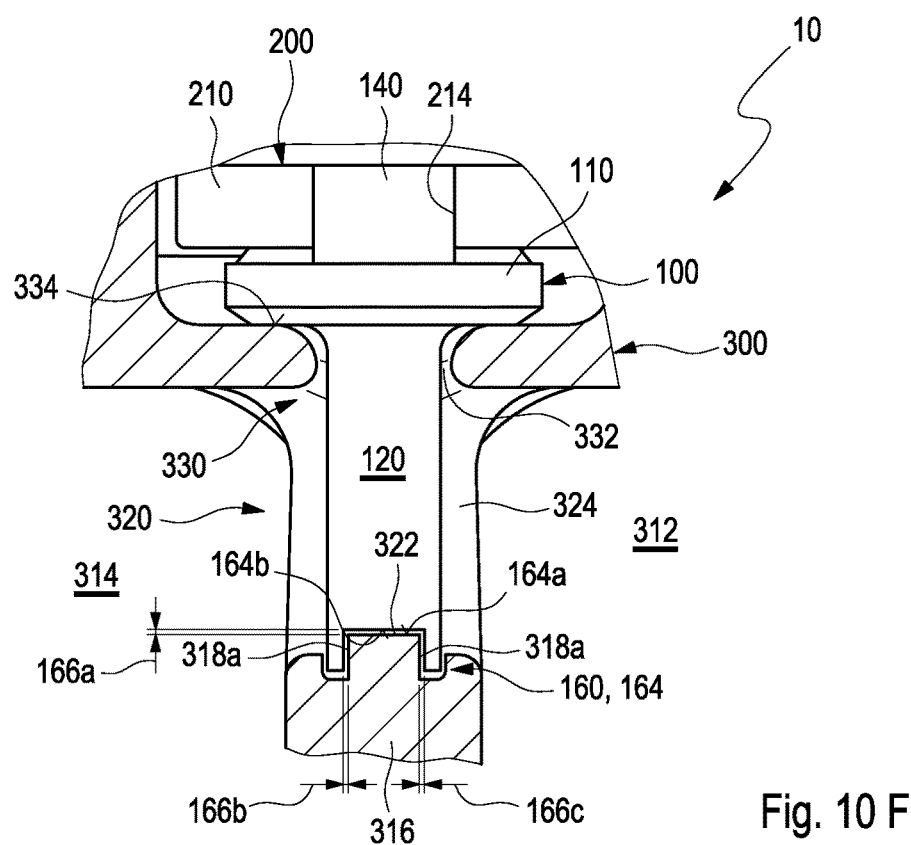

As schematically depicted in FIGS. 10A and 10B, the valve assembly 10 further comprises a sealing 160. The sealing 160 is formed between the fin 120 and the fin seat 322. By providing a sealing 160 between the fin 120 and the fin seat 322, inner leakage between the first volute channel 312 and the second volute channel 314 in the volute connecting region 320 can be prevent or at least reduced, in the first position of the valve body 100. Thus, inner leakage between the admitting and the non-admitting volute channel 312, 314 can be reduced which helps to maintain pulse separation of the respective channels 312, 314 and thereby improves engine transient performance, i.e. reduces time to torque. In this way, the overall efficiency of the device can be increased. According to FIGS. 10C-10E the sealing 160 comprises a sealing element 162. The sealing element 162 may be attached to the fin 120 or to the fin seat 322. The sealing element 162 may comprise different materials and/or structures. To only name a few, the sealing element 162 may comprise a metal mesh, a wire mesh, a sheet metal or any other suitable material. The sealing element 162 can be attached to the fin 120 or to the fin seat 322 by welding, pressing, riveting, gluing or may be formed together with the respective element (fin 120 or to the fin seat 322) in an integrated casting process. Furthermore, other suitable attaching processes known to the skilled person may also be used. The sealing element 120 can be configured in one of various different shapes. Therefore, FIGS. 10C-10E exemplary show three different cross-sections of the sealing element 162. FIG. 10C shows a sealing element 162 having a v-shape cross-section. FIG. 10D shows a sealing element 162 having a c-shape cross-section. FIG. 10D shows a sealing element 162 having a diamond shape or hash shape cross-section. Generally, any other suitable shape is possible. Each sealing element 162 comprises at least one opening in the shape of the cross-section. By the shape of the cross-section different contact forces can be compensates and thus the sealing 160 can be adapted to different requirements.

In another embodiment according to FIG. 10F, the sealing 160 comprises a labyrinth-style sealing portion 164. The labyrinth-style sealing portion 164 comprises a protrusion 164a and a recess 164b. At least in the first position of the valve body 100, the protrusion 164a and the recess 164b engagingly couple with each other. In the example of FIG. 10F the protrusion 164a is formed at the fin seat 322 and follows, i.e. extends along, the contour 321 of the fin seat 322. The recess 164b is formed at the fin 120 and follows, i.e. extends along, the contour 121 of the fin 120. By means of the labyrinth-style sealing portion 164 the fin 120 and the fin seat 322 engagingly interact such that, at least in the first position of the valve body 100, the fin 120 and the fin seat 322 at least partly overlap in a direction from the first volute channel 312 towards the second volute channel 314. In other words, at least in the first position of the valve body 100, the fin 120 and the fin seat 322 at least partly overlap in a direction of the thickness 122 of the fin 120. In alternative embodiments, the protrusion 164a could also be arranged at the fin 120 and the recess 164b could be arranged at the fin seat 322. Although not showing a labyrinth-style sealing portion 164, in FIGS. 10C-10E the fin seat 322 is slightly recessed. Thereby, reception of the sealing element 162 can be improved. Furthermore, the sealing efficiency can be improved. The fin seat 322 can be shaped to fit to the respective shape of the sealing element 162. Alternatively or additionally, the contour of the fin 120 could also be recessed analogously. However, FIGS. 10C-10E do not show a labyrinth-style sealing portion 164 in the meaning of the invention, as the fin 120 and the fin seat 322 do not overlap in a direction from the first volute channel 312 towards the second volute channel 314, not even in the first position of the valve body 100, because the sealing element 162 is therebetween. In comparison to FIGS. 10C-10E, FIG. 6A shows such a labyrinth-style sealing portion 164 wherein the protrusion 164a is arranged at the fin 120 and the recess 164b is arranged at the fin seat 322. Instead of rectangular as shown FIGS. 10F and 6A, a shape of the labyrinth-style sealing portion 164 (i.e. shape of a cross-section of the labyrinth-style sealing portion 164), i.e. shapes of the protrusion 164a and/or the recess 164b could also be round, zig-zag-shaped or spline-shaped. Instead of following the full lengths of the contours 121, 321, the protrusion 164a and/or the recess 164b could only follow part of it, i.e. be only arranged, for instance, in a respective portion of the contours 121, 321 defined by the third radius 128c, 322c (see, e.g. FIG. 4B).

At least the labyrinth-style sealing portion 164 cannot fully prevent inner leakage between the first and the second volute channels 312, 314. The reason for this is that between the fin 120 and the fin seat 322, i.e. divider wall 316, are provided a first gap 166a, a second gap 166b and a third gap 166c (see FIG. 10F). The first gap 166a is provided between the fin 120 and the fin seat 322 in the closing direction of the valve body 100. In other words, first gap 166a is provided between the fin 120 and the fin seat 322 in an orientation of the height 124 of the fin 120. The second and the third gap 166b, 166c are arranged on a respective flank side 318a, 318b of the divider wall 316 adjacent to the fin seat 322. The second and the third gap 166b, 166c are provided in an orientation of the thickness 122 of the fin 120 between the fin and the fin seat 322, i.e. the divider wall 316. These gaps 166a, 166b, 166c have a width of at least 0.1 mm up to 1 mm. However, gaps 166a, 166b, 166c preferably have a maximum width of 0.7 mm and particularly preferably a width of approximately 0.1 mm. Not all gaps 166a, 166b, 166c must have the same width, but can also be configured differently. By providing gaps 166a, 166b, 166c between the fin 120 and the fin seat 322 friction can be prevented, or at least reduced, and thermal deformations can be compensated. The gaps 166a, 166b, 166c also ensure that the plate 110 can be brought into flush contact with the plate seat 334.

The valve assembly 10 generally comprises a valve body 100 having at least one fin 120. With this regard, FIGS. 8A-9B show embodiments of the valve assembly 10 with a valve body 100 having two fins 120. More specifically, the valve body 100 comprises a first fin 120a and a second fin 120b. The first fin 120a and the second fin 120b are arranged spaced apart by at least a thickness 316a of the divider wall 316 on the plate 110 (see FIG. 9B). At least in the first position of the valve body 100 the fins 120a, 120b are arranged on a respective flank side 318a, 318b of the divider wall 316 adjacent to the fin seat 322. As the valve assembly 10 according to this aspect comprises two fins 120a, 120b which can slide to the respective sides, i.e. flank sides 318a, 318b, of the divider wall 316, the contours 121a, 121b of the fins 120a, 120b and the contour 321 of fin seat 322 need not conform to each other (see FIG. 9A). This is possible because sealing between the two volute channels 312, 314 is mainly accomplished by an overlap of the fins 120a, 120b and the fin seat 322, i.e. the divider wall 316 in a direction of the divider wall thickness 316a. Furthermore, the fin geometry, i.e. the contour 121, 121a, 121b is more independent of pivot point 230 from the valve body 100. That means on the other hand that the pivot point 230 can be placed farther away from the housing portion 300, or generally more independently from the shape of the fin 120, 120a, 120b and/or fin seat 322 at a desired position. Thus, packaging can be improved and a larger volute connecting area 320, i.e. a larger opening area of the volute connecting opening 324 (e.g. rectangular instead of rounded) can be implemented. Additionally, manufacturing costs may be reduced as the fins 120, 120a, 120b can be produced in a simpler manner in comparison to a fin 120 wherein the contour 121 has to be precisely adjusted to the fin seat 322.

As illustrated in FIGS. 8B and 8C, the valve opening 332 has a H-shape with a first land 332a and a second land 332b. The first land 332a is longer than the second land 332b. The lands 332a, 332b coincide with the divider wall 316. The first land 332a is arranged opposite the pivot axis 230 with respect to the valve opening 332. The second land 332b is arranged on the same side of the pivot axis 230 with respect to the valve opening 332. The plate 110 has a lengthier segment 117a extending beyond the fins 120, 120a, 120b in a direction, i.e. a side, of the first land 332a. The plate 110 further has a shorter segment 117b extending beyond the fins 120, 120a, 120b in a direction of the second land 322b. Thereby, the lengthier segment 117a is longer than the shorter segment 117b. As can be seen in FIG. 8A, the first fin 120a and the second fin 120b are shaped identically. The first radii 128a of the fins 120, 120a, 120b are larger than the second radii 128b of the fins 120, 120a, 120b, respectively. Thereby, depending on the size and shape of the valve opening 332 a collision of the fins 120, 120a, 120b with the housing portion 300 in an area of the volute opening region 330 can be prevented. A shape of the valve opening 332 is formed round on the sides of the lands 332a, 332b and on the lands 332a, 332b themselves. However, it should be understood that any or all of these round shapes can be adapted in another shape, e.g. rectangular.

Figure 11:
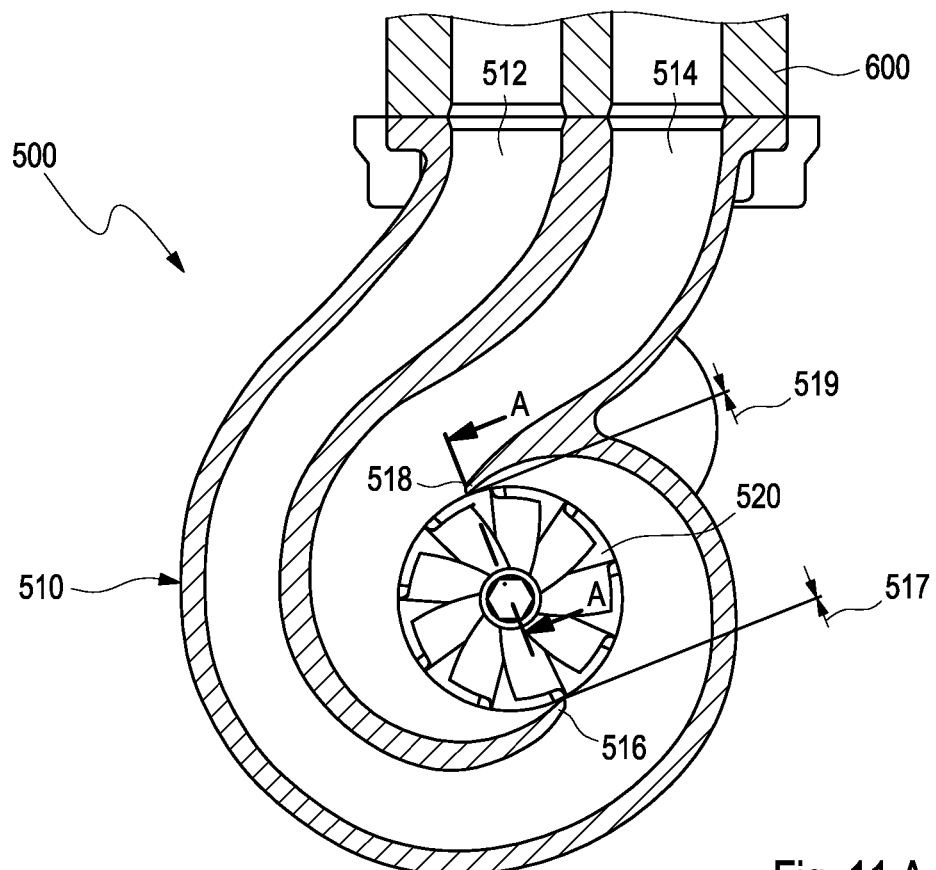
FIG. 11A show the turbine connected to an exhaust manifold in a section top view but without the valve assembly.
FIG. 11B show the turbine connected to an exhaust manifold and a valve assembly arranged in the area of the exhaust manifold in a schematic top view.
FIG. 11C show the turbine in a detailed sectioned side view showing geometric relationships between turbine housing and turbine wheel along the line A-A of FIG. 11A.
Figure 11:
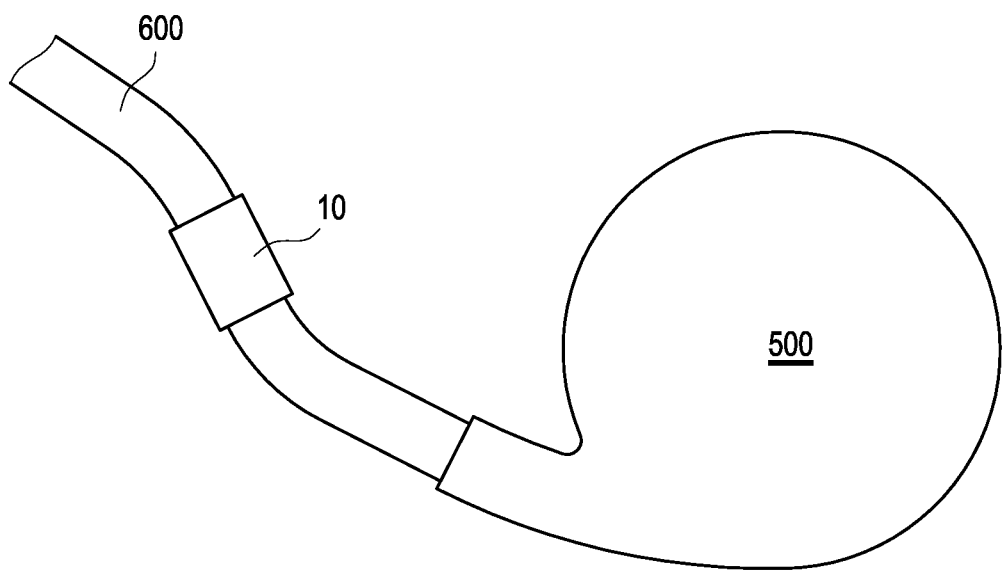
Figure 11:
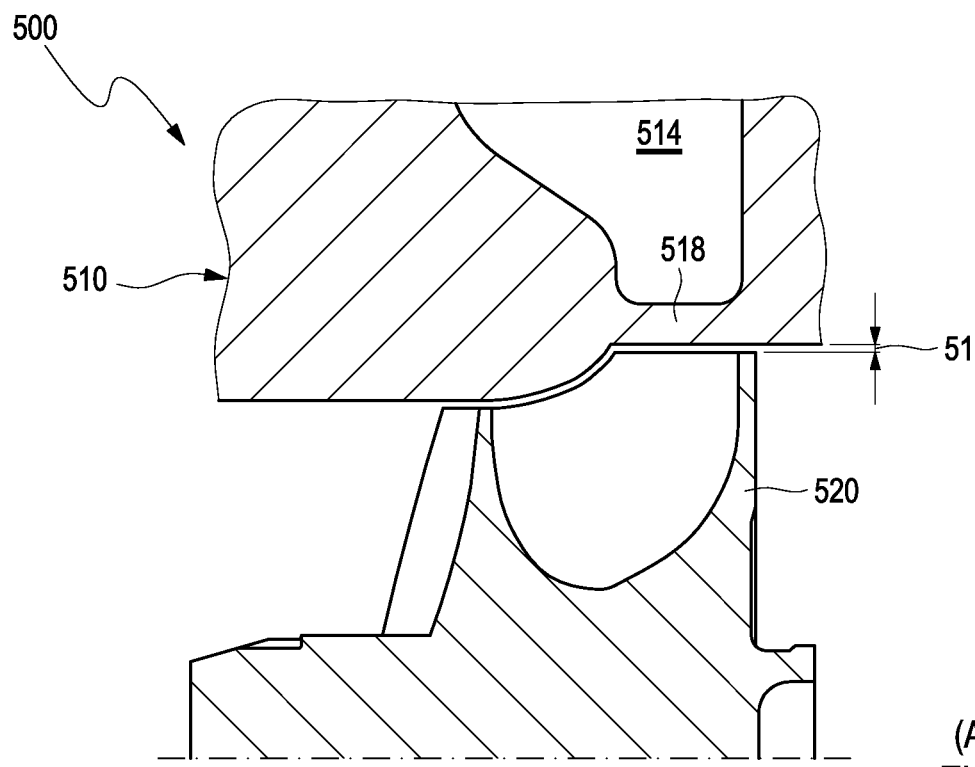

The present invention further relates to a multi-channel turbine 500 for a charging apparatus 20 (see FIGS. 11A-11C). The multi-channel turbine 500 comprises a turbine housing 510 which defines a first volute 512 and a second volute 514. The first volute 512 and the second volute 514 can be connected to an exhaust manifold 600 of an engine 30. The multi-channel turbine 500 comprises a turbine wheel 520 and a valve assembly 10 (not depicted). Alternatively to being arranged in the turbine housing 510, the valve assembly 10 can be arranged in the exhaust manifold 600 as schematically depicted in FIG. 11B. In general, the valve assembly 10 can be a modular part or may be integrally formed with the exhaust manifold 600 or the turbine housing 510. More specifically, the latter means that the housing portion 300 of the valve assembly 10 may be integrally formed with the exhaust manifold 600 or the turbine housing 510. If the valve assembly 10 is a separate, i.e. modular part, the valve assembly 10 can also be arranged between the exhaust manifold 600 and turbine housing 510. As illustrated in FIG. 11A, the first volute 512 and the second volute 514 are separated from each other by a first housing tongue 516 and a second housing tongue 518 of the turbine housing 510 in an inlet region onto the turbine wheel 520. The first housing tongue 516 and the second housing tongue 518 are offset by 180° around the turbine wheel 520. A first radial gap 517 is provided between the turbine wheel 520 and the first housing tongue 516. A second radial gap 519 is provided between the turbine wheel 520 and the second housing tongue 518. FIG. 11C shows a detailed cut according to the section A-A from FIG. 11A, in which the second radial gap 519 can be seen. The first radial gap 517 and the second radial gap 519 assume a value between 0.5 mm and 5 mm, preferably a value between 0.75 mm and 1.5 mm and especially preferably a value of 1 mm. The first radial gap 517 and the second radial gap 519 can also be configured different from each other. The first radial gap 517 and the second radial gap 519 on the one hand ensure that there is no contact between the rotating turbine wheel 520 and the turbine housing 510. This prevents damage to the turbine 500 or even failure of the turbine 500. On the other hand, the narrow design of the radial gaps 517, 519 ensures that the exhaust impulses from the first spiral 512 and the second spiral 514 remain separated until immediately before they hit the turbine wheel 520. This leads to an improved efficiency of the turbine 500.

Figure 12:
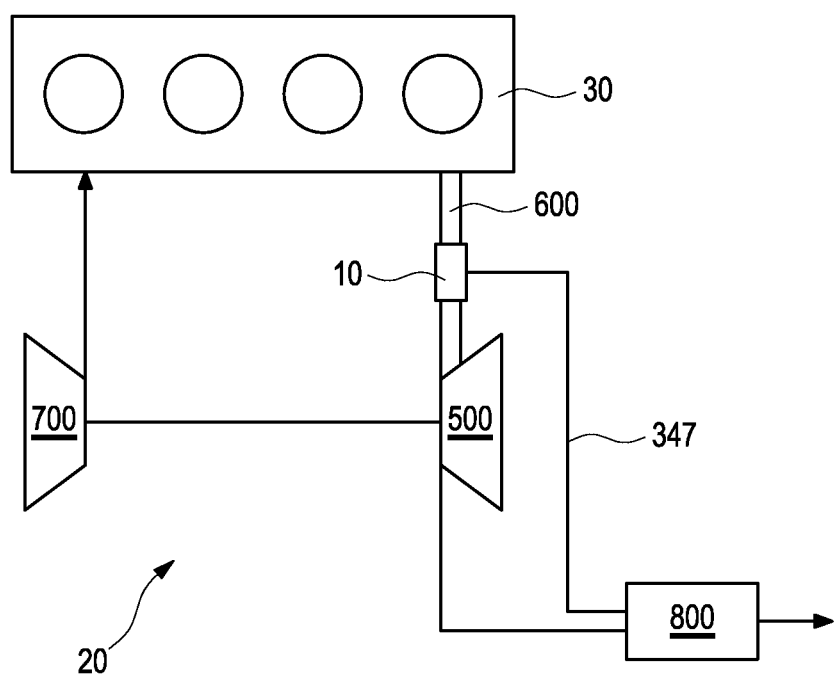
FIG. 12 show a schematic view of the charging apparatus coupled to an engine via an exhaust manifold and to a catalyst via a bypass channel.

The present invention further relates to a charging apparatus 20 which is schematically illustrated in FIG. 12. The charging apparatus 20 comprises a compressor 700 and a turbine 500 which is rotationally coupled to the compressor 700. The charging apparatus further comprises the valve assembly 10 as explained further above. The turbine is fluidically coupled with an exhaust manifold 600 to a combustion engine 30. The valve assembly 10 is arranged between the turbine 500 and the exhaust manifold. As outlined above, the valve assembly 10, i.e. the housing portion 300 can thereby be integrated into the turbine housing 510 or into the exhaust manifold 600 or may be a modular part. The charging apparatus further comprises or is connected to a catalyst 800 downstream of the valve assembly 10 and/or downstream of the turbine 500. The valve assembly 10 comprises a bypass opening 346 which is fluidically coupled with the catalyst via a bypass channel 347.

The present invention further relates to a method for mounting a valve assembly 10 for controlling a volute connecting opening 324 of a multi-channel turbine 500. The method comprises:
- providing a housing portion 300 with a cavity 340, a first volute channel 312 and a second volute channel 314,
- attaching an internal lever 200 to a valve body 100,
- inserting the internal lever 200 and the valve body 100 into the cavity through a housing opening 342,
- inserting a spindle 410 into a drill 348, in particular a drill 348 of the housing portion 300 such that the spindle 410 extends into a spindle hole 222 of the internal lever 200 inside the cavity 340, and
- welding inside the cavity 340 the spindle 410 to the internal lever 200 through an opening 224 of the internal lever 200 which extends into the spindle hole 222.

The internal lever 200 may be attached to valve body 100 before or after inserting them into the cavity 340. Alternatively, the internal lever 200 and the valve body 100 may be provided integrally formed with each other. If they are not integrally formed, a connecting portion 130 of the valve body 100 is inserted into a connecting hole 212 of the internal lever 200, i.e. of a valve portion 210 of the internal lever 200 and is secured via a washer 150. The washer 150 is welded to the valve body 100. In particular, the washer 150 is welded to the connecting portion 130. Inserting the internal lever 200 and the valve body 100 into the cavity 340 comprises bringing into contact a valve plate 110 of the valve body 100 with a plate seat 334. The plate seat 334 surrounds a valve opening 332. The valve opening 332 fluidically couples the cavity 340 and a volute connecting region 320 between the first volute channel 312 and the second volute channel 314. The valve plate 110 maintains in contact with the plate seat 334 during welding. Inserting the internal lever 200 and the valve body 100 into the cavity 340 comprises inserting a fin 120 connected to the valve plate 110 of the valve body 100 through the valve opening 332 from the cavity 340 into the volute connecting region 330 to interact with a fin seat 322 and bringing into contact the valve plate 110 with a plate seat 334 surrounding the valve opening 332. After welding the spindle 410 to the internal lever 200, the housing opening 332 is closed with a cover 350. A gasket 360 is inserted between the cover 350 and the housing portion 300 before closing the housing opening 332 with the cover 350. After welding the spindle 410 to the internal lever 200, an actuating lever 430 is attached to the spindle 410 outside the housing portion 300. Thereby, the actuation lever 430 can be attached to the spindle 410 in any desired orientation. That means by first welding the spindle 410 to the internal lever 200 in a closed position of the valve body 100, the actuation lever 430 can be attached in an exact rotational orientation as required by an actuation system. Thereby, the chance of assembling errors, i.e. a wrong/not exact orientation of the actuation lever 430 can be prevented or at least reduced. Before inserting the spindle 410, a bushing 420 is inserted into the drill 348. The spindle 410 is subsequently inserted into the bushing 420.

It should be understood that the present invention can also alternatively be defined in accordance with the following embodiments:

A valve assembly (10) for controlling a volute connecting opening (324) of a multi-channel turbine (50) comprising:

a housing portion (300) with a first volute channel (312), a second volute channel (314) and a volute connecting region (320) between the first volute channel (312) and the second volute channel (314) defining a volute connecting opening (324), a valve body (100) inserted in a cavity (340) of the housing portion (300) and comprising at least one fin (120), and an internal lever (200) coupled with the valve body (100) and configured to pivotably move the valve body (100) between a first position and a second position, wherein in the first position of the valve body (100) the fin (120) blocks the volute connecting opening (324) and, wherein in the second position of the valve body (100) the fin (120) clears the volute connecting opening (324).

The valve assembly (10) of embodiment 1, wherein the valve body (100) further comprises a plate (110) and wherein the fin (120) protrudes from the plate (110) in a first direction.

The valve assembly (10) of any one of the previous embodiments, wherein the housing portion (300) comprises a divider wall (316) separating the first volute channel (312) and the second volute channel (314), wherein the volute connecting opening (324) is arranged in the divider wall (316) defining a fin seat (322) and wherein the fin (120) interacts with the fin seat (322) to block the volute connecting opening (324) in the first position of the valve body (100).

the valve assembly (10) of any one of the previous embodiments, wherein the internal lever (200) comprises a valve portion (210) and a spindle portion (220).

The valve assembly (10) of embodiment 4, wherein the internal lever (200) is coupled with the valve body (100) via the valve portion (210).

The valve assembly (10) of embodiment 5, if dependent on embodiment 2, wherein the valve body (100) further comprises a connecting portion (130) protruding from the plate (110) in a second direction opposite to the fin (120) wherein the valve portion (210) is coupled to the connecting portion (130).

The valve assembly (10) of embodiment 6, wherein the valve portion (210) further comprises a connecting hole (212) and wherein the connecting portion (130) is arranged at least partly inside the connecting hole (212).

The valve assembly (10) of any one of embodiments 6 or 7, wherein the valve portion (210) is secured to the connecting portion (130) via a washer (150).

The valve assembly (10) of any one of embodiments 4 to 8, wherein the valve body (100) comprises a stop (140) and wherein the valve portion (210) comprises an orientation recess (214) which is engaged with the stop (140) to rotationally secure the internal lever (200) with respect to the valve body (100).

The valve assembly (10) of any one of embodiments 4 to 9, further comprising a lever assembly (400) with a spindle (410), wherein the internal lever (200) is coupled with the spindle (410) in the cavity (340) via the spindle portion (210).

The valve assembly (10) of embodiment 10, wherein the spindle portion (210) comprises a spindle hole (222) into which the spindle (410) is inserted to be coupled with the internal lever (200), and, optionally, wherein the spindle portion (210) comprises an opening (224) extending into the spindle hole (222) for weldingly coupling the spindle (410) to the internal lever (200).

The valve assembly (10) of any one of embodiments 10 or 11, wherein the spindle (410) is rotatably supported in the housing portion (300) to pivot the internal lever (200) thereby defining a pivot axis (230).

The valve assembly (10) of embodiment 12, wherein the lever assembly (400) further comprises a bushing (420) arranged in the housing portion (300) rotatably supporting the spindle (410).

The valve assembly (10) of any one of embodiments 10 to 13, wherein the lever assembly (400) further comprises an actuating lever (430) coupled to the spindle (420) outside the housing portion (300).

The valve assembly (10) of embodiment 14, wherein the lever assembly (400) further comprises an actuating pin (440) coupled to the actuating lever (430).

The valve assembly (10) of any one of the previous embodiments, wherein the housing portion (300) comprises a volute opening region (330) with a valve opening (332) fluidically coupling the cavity (340) and the volute connecting region (320) and enabling movement of the valve body (100) between the first position and the second position.

The valve assembly (10) of embodiment 16, if dependent on embodiment 2, wherein the housing portion (300) defines a plate seat (334) in the volute opening region (330) surrounding the valve opening (332) and wherein the plate (110) interacts with the plate seat (334) in the first position of the valve body (100).

The valve assembly (10) of any one of the previous embodiments further comprising a cover (350) closing off a housing opening (342) which extends from outside the housing portion (300) into the cavity (340).

The valve assembly (10) of embodiment 18, wherein the cover (350) is arranged on a flange portion (352) of the housing portion (300) surrounding the housing opening (342).

The valve assembly (10) of any one of embodiments 18 or 19 further comprising a gasket (360) sealing the housing opening (342) between the housing portion (300) and the cover (350) and, optionally, wherein the gasket (360) is arranged in a sealing recess (362) of the housing portion (300).

The valve assembly (10) of any one of the previous embodiments, wherein the housing portion (300) further comprises a bypass opening (346) which is arranged in the cavity (300) and which is fluidically coupled with a bypass channel (347).

The valve assembly (10) of any one of the previous embodiments, if dependent on embodiment 3, wherein the fin (120) has a generally wall-like shape with a thickness (122), a height (124) and a length (126), wherein a contour (121) of the fin (120) is defined by at least a first radius (128a) and a second radius (128b) lying in the plane of the height (124) and the length (126), and wherein the contour (321) of the fin seat (322) is defined by at least a first radius (322a) and a second radius (322b).

The valve assembly (10) of embodiment 22, wherein the first radii (128a, 322a) define respective portions of the contours (121, 321) opposite of the pivot axis (230) of the internal lever (200) with respect to the volute connecting opening (324), and wherein the centers of the first radii (128a, 322a) coincide with the pivot axis (230).

The valve assembly (10) of any one of the previous embodiments, if dependent on embodiment 3, further comprising a sealing (160) formed between the fin (120) and the fin seat (322).

The valve assembly (10) of embodiment 24, wherein the sealing (160) comprises a sealing element (162) and optionally, wherein the sealing element (162) is attached to the fin (120) or to the fin seat (322).

The valve assembly (10) of embodiment 24, wherein the sealing (160) comprises a labyrinth-style sealing portion (164) by means of which the fin (120) and the fin seat (322) engagingly interact such that at least in the first position of the valve body (100) the fin (120) and the fin seat (322) at least partly overlap in a direction from the first volute channel (312) towards the second volute channel (314).

The valve assembly (10) of embodiment 26, if dependent on embodiment 22, wherein the labyrinth-style sealing portion (164) comprises a protrusion (164a) and a recess (164b), which at least in the first position of the valve body (100) engagingly couple with each other, wherein the protrusion (164a) is formed at one of the fin (120) or the fin seat (322) and follows the respective one contour (121, 321) and wherein the recess (164b) is formed at the other of the fin (120) and the fin seat (322) and follows the respective other contour (121, 321).

The valve assembly (10) of embodiment 22, wherein the valve assembly (10) comprises a first fin (120a) and a second fin (120b) arranged spaced apart by at least a thickness (316a) of the divider wall (316) on the plate (110), such that at least in the first position of the valve body (100) the fins (120a, 120b) are arranged on a respective flank side (318a, 318b) of the divider wall (316) adjacent to the fin seat (322).

The valve assembly (10) of embodiment 28, if dependent on embodiment 16, wherein the valve opening (332) has an H-shape with a first land (332a) and a second land (332b), the first land being (332a) longer than the second land (332b) and wherein the lands (332a, 332b) coincide with the divider wall (316), and wherein the first land (332a) is arranged opposite the pivot axis (230) with respect to the valve opening (332) and the second land (332b) is arranged on the same side of the pivot axis (230) with respect to the valve opening (332).

The valve assembly (10) of embodiment 29, wherein the plate (110) has a lengthier segment (117a) extending beyond the fins (120a, 120b) in a direction of the first land (332a) and a shorter segment (117b) extending beyond the fins (120a, 120b) in a direction of the second land (332b).

The valve assembly (10) of any one of embodiments 28 to 30, wherein the first fin (120a) and the second fin (120b) are shaped identically, and optionally, wherein the first radii (128a) of the fins (120a, 120b) are larger than the second radii (128b) of the fins (120a, 120b), respectively.

A multi-channel turbine (500) for a charging apparatus comprising:
a turbine housing (510) defining a first volute (512) and a second volute (514) being connected to an exhaust manifold (600) of an engine (30),
a turbine wheel (520), and
a valve assembly (10) of any one of the previous embodiments.

The multi-channel turbine (500) of embodiment 32, wherein the valve assembly (10) is arranged in the exhaust manifold (600) or in the turbine housing (510).

The multi-channel turbine (500) of any one of embodiments 32 or 33, wherein the valve assembly (10) is a modular part or wherein the housing portion (300) is integrally formed with the exhaust manifold (600) or the turbine housing (500).

The multi-channel turbine (500) of any one of embodiments 32 to 34, wherein the first and the second volute (512, 514) are separated from each other by a first housing tongue (516) and a second housing tongue (518) of the turbine housing (510) in an inlet region onto the turbine wheel (520).

The multi-channel turbine (500) of embodiment 35, wherein a first radial gap (517) is provided between the turbine wheel (520) and the first housing tongue (516) and wherein a second radial gap (519) is provided between the turbine wheel (520) and the second housing tongue (518).

The multi-channel turbine (500) of embodiment 36, wherein the first radial gap (317) and/or the second radial gap (319) have a width of 0.5 mm to 5 mm, preferably a width between 0.75 mm and 1.5 mm and in particular, a width of 1 mm.

A charging apparatus (20) comprising:
a compressor (700), and
a turbine (500) of any one of the previous embodiments which is rotationally coupled to the compressor (700).

The charging apparatus (20) of embodiment 38, if dependent on embodiment 21, further comprising a catalyst (800) which is arranged downstream of the turbine (500) and fluidically coupled with the bypass channel (347).

A method for mounting a valve assembly (10) for controlling a volute connecting opening (324) of a multi-channel turbine (50), the method comprising:
providing a housing portion (300) with a cavity (340), a first volute channel (312) and a second volute channel (314),
attaching an internal lever (200) to a valve body (100),
inserting the internal lever (200) and the valve body (100) into the cavity (340) through a housing opening (342),
inserting a spindle (410) into a drill (348) such that it extends into a spindle hole (222) of the internal lever (200) inside the cavity (340), and welding the spindle (410) inside the cavity (340) to the internal lever (200) through an opening (224) of the internal lever (200) which extends into the spindle hole (222).

The method of embodiment 40, wherein the internal lever (200) and the valve body (100) are integrally formed with each other, or, wherein a connecting portion (130) of the valve body (100) is inserted into a connecting hole (212) of the internal lever (200) and secured via a washer (150).

The method of any of embodiments 40 or 41, wherein inserting the internal lever (200) and the valve body (100) into the cavity (340) comprises bringing into contact a valve plate (110) of the valve body (100) with a plate seat (334) surrounding a valve opening (332) which fluidically couples the cavity (340) and a volute connecting region (320) between the first volute channel (312) and the second volute channel (314).

The method of embodiment 42, wherein the valve plate (110) maintains in contact with the plate seat (334) during welding.

The method of any of embodiments 40 or 41, wherein inserting the internal lever (200) and the valve body (100) into the cavity (340) comprises inserting a fin (120) connected to a valve plate (110) of the valve body (100) through a valve opening (322) from the cavity (340) into a volute connecting region (320) to interact with a fin seat (322) and bringing into contact the valve plate (110) with a plate seat (334) surrounding the valve opening (332).

The method of any of embodiments 40 to 44, wherein after welding the housing opening is closed with a cover (350), and optionally, wherein a gasket (360) is inserted between the cover (350) and the housing portion (300).

The method of any of embodiments 40 to 45, wherein after welding an actuating lever (430) is attached to the spindle (410) outside the housing portion (300).

The method of any of embodiments 40 to 46, wherein before inserting the spindle (410), a bushing (420) is inserted into the drill (348) and the spindle (410) is subsequently inserted into the bushing (420).

The invention claimed is:

1. A valve assembly (10) for controlling a volute connecting opening (324) of a multi-channel turbine (50) comprising:
   a housing portion (300) with a first volute channel (312), a second volute channel (314) and a volute connecting region (320) between the first volute channel (312) and the second volute channel (314) defining the volute connecting opening (324),
   a valve body (100) inserted in a cavity (340) of the housing portion (300) and comprising at least one fin (120), and
   an internal lever (200) coupled with the valve body (100) and configured to pivotably move the valve body (100) between a first position and a second position,
   wherein in the first position of the valve body (100) the fin (120) blocks the volute connecting opening (324) and, wherein in the second position of the valve body (100) the fin (120) clears the volute connecting opening (324),
   wherein the internal lever (200) comprises a valve portion (210) and a spindle portion (220),
   the valve assembly (10) further comprising a lever assembly (400) with a spindle (410), wherein the internal lever (200) is coupled with the spindle (410) inside the cavity (340) via the spindle portion (220),
   wherein the spindle portion (220) comprises a spindle hole (222) into which the spindle (410) is inserted to be coupled with the internal lever (200), wherein the spindle portion (220) comprises an opening (224) extending into the spindle hole (222) for weldingly coupling the spindle (410) to the internal lever (200); and
   wherein the at least one fin (120) is configured to withdraw through a side wall of the housing portion (300) to reach the second position and is configured to extend through the side well to reach the first position.

2. The valve assembly (10) of claim 1, wherein the valve body (100) further comprises a plate (110) and wherein the fin (120) protrudes from the plate (110) in a first direction.

3. The valve assembly (10) of claim 1, wherein the housing portion (300) comprises a divider wall (316) separating the first volute channel (312) and the second volute channel (314), wherein the volute connecting opening (324) is arranged in the divider wall (316) defining a fin seat (322) and wherein the fin (120) interacts with the fin seat (322) to block the volute connecting opening (324) in the first position of the valve body (100).

4. The valve assembly (10) of claim 3, wherein the fin (120) has a generally wall-like shape with a thickness (122), a height (124) and a length (126), wherein a contour (121) of the fin (120) is defined by at least a first radius (128a) and a second radius (128b) lying in the plane of the height (124) and the length (126), and wherein a contour (321) of the fin seat (322) is defined by at least another first radius (322a) and another second radius (322b).

5. The valve assembly (10) of claim 4, wherein the valve assembly (10) comprises a first fin (120a) and a second fin (120b) arranged spaced apart by at least a thickness (316a) of the divider wall (316) on a plate (110), such that at least in the first position of the valve body (100) the fins (120a, 120b) are arranged on a respective flank side (318a, 318b) of the divider wall (316) adjacent to the fin seat (322).

6. The valve assembly (10) of claim 5, wherein the housing portion (300) comprises a volute opening region (330) with a valve opening (332) fluidically coupling the cavity (340) and the volute connecting region (320) and enabling movement of the valve body (100) between the first position and the second position and wherein the valve opening (332) has an H-shape with a first land (332a) and a second land (332b), the first land being (332a) longer than the second land (332b) and wherein the lands (332a, 332b) coincide with the divider wall (316), and wherein the first land (332a) is arranged opposite a pivot axis (230) with respect to the valve opening (332) and the second land (332b) is arranged on a same side of the pivot axis (230) with respect to the valve opening (332).

7. The valve assembly (10) of claim 4, wherein the first radii (128a, 322a) define respective portions of the contours (121, 321) opposite of a pivot axis (230) of the internal lever (200) with respect to the volute connecting opening (324), and wherein the centers of the first radii (128a, 322a) coincide with the pivot axis (230).

8. The valve assembly (10) of claim 3, further comprising a sealing (160) formed between the fin (120) and the fin seat (322).

9. The valve assembly (10) of claim 1, wherein the housing portion (300) comprises a volute opening region (330) with a valve opening (332) fluidically coupling the cavity (340) and the volute connecting region (320) and enabling movement of the valve body (100) between the first position and the second position.

10. The valve assembly (10) of claim 1, further comprising a cover (350) closing off a housing opening (342) which extends from outside the housing portion (300) into the cavity (340).

11. The valve assembly (10) of claim 10, wherein the valve assembly (10) further comprises a gasket (360) sealing the housing opening (342) between the housing portion (300) and the cover (350), or
wherein the valve assembly (10) further comprises the gasket (360) sealing the housing opening (342) between the housing portion (300) and the cover (350), wherein the gasket (360) is arranged in a sealing recess (362) of the housing portion (300).

12. The valve assembly (10) of claim 1, wherein the housing portion (300) further comprises a bypass opening (346) which is arranged in the cavity (300) and which is fluidically coupled with a bypass channel (347).

13. A multi-channel turbine (500) for a charging apparatus comprising:
a turbine housing (510) defining a first volute (512) and a second volute (514) being connected to an exhaust manifold (600) of an engine (30),
a turbine wheel (520), and
a valve assembly (10) of claim 1.

14. The multi-channel turbine (500) of claim 13, wherein the valve assembly (10) is a modular part or wherein the housing portion (300) is integrally formed with the exhaust manifold (600) or the turbine housing (500).

15. A charging apparatus (20) comprising:
a compressor (700), and
a turbine (500) of claim 13 which is rotationally coupled to the compressor (700).

16. The valve assembly (10) of claim 15, wherein the housing portion (300) further comprises a bypass opening (346) which is arranged in the cavity (300) and which is fluidically coupled with a bypass channel (347) and further comprising a catalyst (800) which is arranged downstream of the turbine (500) and fluidically coupled with the bypass channel (347).

17. The valve assembly (10) of claim 13, wherein the valve assembly (10) is arranged in the exhaust manifold (600) or in the turbine housing (510).

18. A method for mounting the valve assembly (10) of claim 1 for controlling the volute connecting opening (324) of the multi-channel turbine (50), the method comprising:
providing the housing portion (300) with the cavity (340), the first volute channel (312) and the second volute channel (314),
attaching the internal lever (200) to the valve body (100),
inserting the internal lever (200) and the valve body (100) into the cavity (340) through a housing opening (342),
inserting the spindle (410) into a drill (348) such that the spindle extends into the spindle hole (222) of the internal lever (200) inside the cavity (340), and
welding the spindle (410) inside the cavity (340) to the internal lever (200) through the opening (224) of the internal lever (200) which extends into the spindle hole (222).

19. The method for mounting the valve assembly (10) of claim 18, wherein inserting the internal lever (200) and the valve body (100) into the cavity (340) comprises bringing into contact a valve plate (110) of the valve body (100) with a plate seat (334) surrounding a valve opening (332) which fluidically couples the cavity (340) and the volute connecting region (320) between the first volute channel (312) and the second volute channel (314).

20. The valve assembly (10) of claim 1, wherein the internal lever (200) is coupled with the valve body (100) via the valve portion (210).

* * * * *